United States Patent
Sato et al.

[11] Patent Number: 6,136,609
[45] Date of Patent: *Oct. 24, 2000

[54] METHOD OF AND APPARATUS FOR PROCESSING HIGH-PRESSURE LIQUID MATERIAL

[75] Inventors: Tetsu Sato; Takahiro Inakuma; Yukio Ishiguro, all of Tochigi; Naoji Komeya, Tokyo; Masami Shibamoto, Tokyo; Yukio Matsuda, Tokyo, all of Japan

[73] Assignee: Kagome Kabushiki Kaisha, Aicha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/517,387

[22] Filed: Aug. 21, 1995

[30] Foreign Application Priority Data

Nov. 14, 1994 [JP] Japan .................................. 6-302639

[51] Int. Cl.⁷ ...................................................... G01N 1/14
[52] U.S. Cl. .............................. 436/180; 99/275; 99/453; 99/467; 422/1; 422/39; 422/100; 422/242
[58] Field of Search .................................... 422/242, 100, 422/1, 39; 99/275, 453, 467; 417/92; 73/863.31, 864.61, 864.62; 436/180

[56] References Cited

U.S. PATENT DOCUMENTS

| 4,347,223 | 8/1982 | Kitaoka ................................. | 422/242 |
| 4,512,188 | 4/1985 | Erickson ............................... | 73/198 |
| 5,165,325 | 11/1992 | Akatsu ................................. | 99/275 |

FOREIGN PATENT DOCUMENTS

| 4-241869 | 8/1992 | Japan . |
| 5-317015 | 12/1993 | Japan . |
| 6-277266 | 10/1994 | Japan . |
| 6-277267 | 10/1994 | Japan . |
| 6-237446 | 11/1994 | Japan . |
| 6-327445 | 11/1994 | Japan . |
| 6-343433 | 12/1994 | Japan . |

OTHER PUBLICATIONS

Keiichi et al, Patent Abstracts of Japan, vol. 940 No. 010–JP6277266 Abstract, Oct. 4, 1994.
Keiichi et al, Patent Abstracts of Japan, vol. 940 No. 010–JP6277267 Abstract, Oct. 4, 1994.

*Primary Examiner*—Jan Ludlow
*Attorney, Agent, or Firm*—Merchant & Gould P.C.

[57] ABSTRACT

An apparatus for processing a high-pressure liquid material has a high-pressure vessel, a pressurizing assembly for supplying a liquid material to the high-pressure vessel in order to allow the high-pressure vessel to process the liquid material under a high pressure therein, a depressurizing assembly for receiving and depressurizing the processed liquid material supplied under a high pressure from the high-pressure vessel, and a working fluid control system for controlling the depressurizing assembly. The depressurizing assembly has a plurality of cylinder device comprising respective pairs of interlinked pistons which define, in the cylinder devices, respective processing pressure chambers for selectively receiving the liquid material from the high-pressure vessel, and respective working pressure chambers for selectively receiving a working fluid from the working fluid control system. The working fluid control system brings one of the working pressure chambers into communication with at least another one of the working pressure chambers to pass the working fluid therebetween for causing the cylinder device to successively draw, depressurize, and discharge the liquid material in respective suction, depressurization, and discharge modes.

22 Claims, 15 Drawing Sheets

METHOD OF AND APPARATUS FOR PROCESSING HIGH-PRESSURE LIQUID MATERIAL

BACKGROUND OF THE INVENTION

1. Field of the Invention

The present invention relates to a method of and an apparatus for processing a high-pressure liquid material.

2. Description of the Prior Art

One conventional apparatus for continuously processing a high-pressure liquid material is disclosed in Japanese laid-open patent publication No. 4-241869, for example. The disclosed apparatus has a high-pressure vessel for processing a liquid material under a high pressure therein, a pressurizing means for introducing the liquid material into the high-pressure vessel and pressurizing the liquid material in the high-pressure vessel, and a depressurizing means for drawing the processed liquid material from the high-pressure vessel, depressurizing the liquid material, and discharging the liquid material out of a system. The apparatus is capable of continuously processing the liquid material under a predetermined pressure, and depressurizing and discharging the processed liquid material out of the system.

In the conventional apparatus for processing a high-pressure liquid material, the depressurizing means comprises a pair of coaxially positioned pressure chambers for receiving the liquid material that has been processed. The liquid material is drawn into the pressure chambers (suction mode), depressurized in the pressure chambers (depressurization mode), and discharged from the pressure chambers (discharge mode) by a pair of respective plungers actuatable in synchronism with each other. The plungers are controlled by a double-acting hydraulic cylinder assembly which has a pair of working pressure chambers supplied with a working oil from a hydraulic unit. The depressurizing means is elongate and requires a large installation space.

The volume of one of the pressure chambers of the depressurizing means is uniquely determined by the volume of the other pressure chamber thereof. When the first pressure chamber is in the suction and depressurization modes, the second pressure chamber is of necessity in the discharge mode. Accordingly, the depressurizing means lacks a sufficient degree of freedom of operation. Specifically, no sufficient flexibility is given to the layout of the working pressure chambers, the individual volumes thereof, and the pressure control thereof, and the pressure of the working oil discharged in the suction and depressurization modes cannot be utilized as an energy for actuating the pressure chambers in the discharge mode.

More specifically, the working pressure chambers cannot freely be supplied with the working oil from the hydraulic unit and cannot freely discharge the working oil by controlling shutoff valves. Therefore, it is impossible to adjust any times for which to carry out the suction mode, the depressurization mode, and the discharge mode. For example, it is not possible to adjust times for which to carry out the suction and depressurization modes while the discharge mode is being continuously carried out for a certain period of time.

In addition, the working oil from the hydraulic unit is used only to apply a back pressure after the liquid material has been introduced under a high pressure for reducing the rate of the discharge mode or the suction and depressurization modes. Stated otherwise, inasmuch as no pressurization is effected to apply a back pressure which would otherwise substantially counterbalance the high pressure of the liquid material before the suction mode, a pressure shock is imposed on pipes and various valves upon start of the suction mode, lowering the durability of these components.

SUMMARY OF THE INVENTION

It is therefore an object of the present invention to provide a method of and an apparatus for processing a high-pressure liquid material while saving the amount of energy required to operate the apparatus, the apparatus requiring a reduced space for its installation.

Another object of the present invention is to provide a method of and an apparatus for processing a high-pressure liquid material with a plurality of cylinder devices which are arranged such that a working fluid discharged from any one of the cylinder devices when it draws or depressurizes the liquid material in its suction or depressurization mode is effectively utilized to cause another cylinder devices to discharge the liquid material in a discharge mode.

According to the present invention, there is provided an apparatus for processing a high-pressure liquid material, comprising a high-pressure vessel, pressurizing means for supplying a liquid material to said high-pressure vessel in order to allow the high-pressure vessel to process the liquid material under a high pressure therein, depressurizing means for receiving and depressurizing the processed liquid material supplied under a high pressure from said high-pressure vessel, and a working fluid control system for controlling said depressurizing means, said depressurizing means having a plurality of cylinder devices comprising respective pairs of interlinked pistons which define, in said cylinder devices, respective processing pressure chambers for selectively receiving the liquid material from said high-pressure vessel, and respective working pressure chambers for selectively receiving a working fluid from said working fluid control system, said working fluid control system comprising means for bringing one of said working pressure chambers into communication with at least another one of the working pressure chambers to pass the working fluid therebetween for causing said cylinder device to successively draw, depressurize, and discharge the liquid material in respective suction, depressurization, and discharge modes.

The working fluid control system may supply the working fluid discharged from the working pressure chamber of one of said cylinder devices which is operating in at least the suction mode to the working pressure chamber of another one of said cylinder devices which is operating in the discharge mode.

Alternatively, the working fluid control system may supply the working fluid discharged from the working pressure chamber of another one of said cylinder devices which is operating in said depressurization mode, together with the working fluid discharged from the working pressure chamber of said one of the cylinder devices which is operating in said suction mode, to the working pressure chamber of said other one of said cylinder devices which is operating in said discharge mode.

With the above arrangement, at least a portion of the working fluid discharged from the working pressure chamber of one of the cylinder devices which is operating in said suction mode and the working pressure chamber of another one of said cylinder devices which is operating in said depressurization mode is supplied to the working pressure chamber of another one of said cylinder devices which is operating in said discharge mode to assist it to perform the discharge mode.

The working fluid control system may supply the working fluid discharged from the working pressure chamber of one of said cylinder devices which is operating in the suction mode to the working pressure chamber of another one of said cylinder devices which has completed the discharge mode to apply a back pressure to said piston which defines the processing pressure chamber of said other one of said cylinder devices.

The back pressure is applied in a pressurization mode prior to the suction mode so as to substantially counterbalance the high pressure of the liquid material supplied from the high-pressure vessel. Therefore, when said one of the cylinder devices which has completed the discharge mode starts to draw the liquid material in the suction mode, no pressure shocks are imposed on pipes and various valves upon an influx of the liquid material from the high-pressure vessel into the processing pressure chamber of said one of the cylinder devices. Therefore, these components are protected against damage for high durability, and the liquid material is prevented from flowing unduly rapidly through shutoff valves.

The working fluid control system may comprise a working fluid tank containing the working fluid, a pump for supplying the working fluid from said working fluid tank selectively to the working pressure chambers of said cylinder devices, and means for supplying the working fluid from said working fluid tank to the working pressure chamber of one of said cylinder devices which is operating in the discharge mode.

By operating the pump and opening and closing shutoff valves associated therewith, the working fluid can be supplied from the working fluid tank selectively to the working pressure chamber of any one of the cylinder devices which operates in the discharge mode. The cylinder device can reliably operate in the discharge mode, and the depressurizing means and the working fluid control system be replenished with the working fluid from the working fluid tank by the pump. Consequently, an appropriate amount of working fluid can be maintained in the working fluid control system which can supply the working fluid selectively to and discharge the working fluid selectively from the working pressure chambers of the cylinder devices, for thereby allowing the cylinder devices to operate constantly and reliably in the suction, depressurization, and discharge modes.

The depressurizing means may have first, second, and third cylinder devices, and said working fluid control system may comprise a first piping for depressurizing and supplying the working fluid from the working pressure chamber of the first cylinder device which is operating in the suction mode to the working pressure chamber of the second cylinder device which is operating in the discharge mode, a second piping for depressurizing and supplying the working fluid from the working pressure chamber of the third cylinder device which is operating in the depressurization mode to the working pressure chamber of the second cylinder device which is operating in the discharge mode, and a third piping for supplying the working fluid from the working pressure chamber of the first cylinder device which is operating in the suction mode to the working pressure chamber of the second cylinder device which has completed the discharge mode.

The pressurization mode may be carried out prior to the suction mode, using the third piping.

According to the present invention, there is also provided a method, which can be carried out by the apparatus described above, of processing a high-pressure liquid material, comprising the steps of supplying a liquid material to a high-pressure vessel from pressurizing means, processing the liquid material under a high pressure in said high-pressure vessel, thereafter depressurizing the liquid material with depressurizing means, said depressurizing means having a plurality of cylinder devices comprising respective pairs of interlinked pistons which define, in said cylinder devices, respective processing pressure chambers for selectively receiving the liquid material from said high-pressure vessel, and respective working pressure chambers for selectively receiving a working fluid, and bringing one of said working pressure chambers into communication with at least another one of the working pressure chambers to pass the working fluid therebetween for causing said cylinder device to successively draw, depressurize, and discharge the liquid material in respective suction, depressurization, and discharge modes.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

FIGS. 1 through 5 show an apparatus for processing a high-pressure liquid material according to a first embodiment of the present invention.

Figure 1:
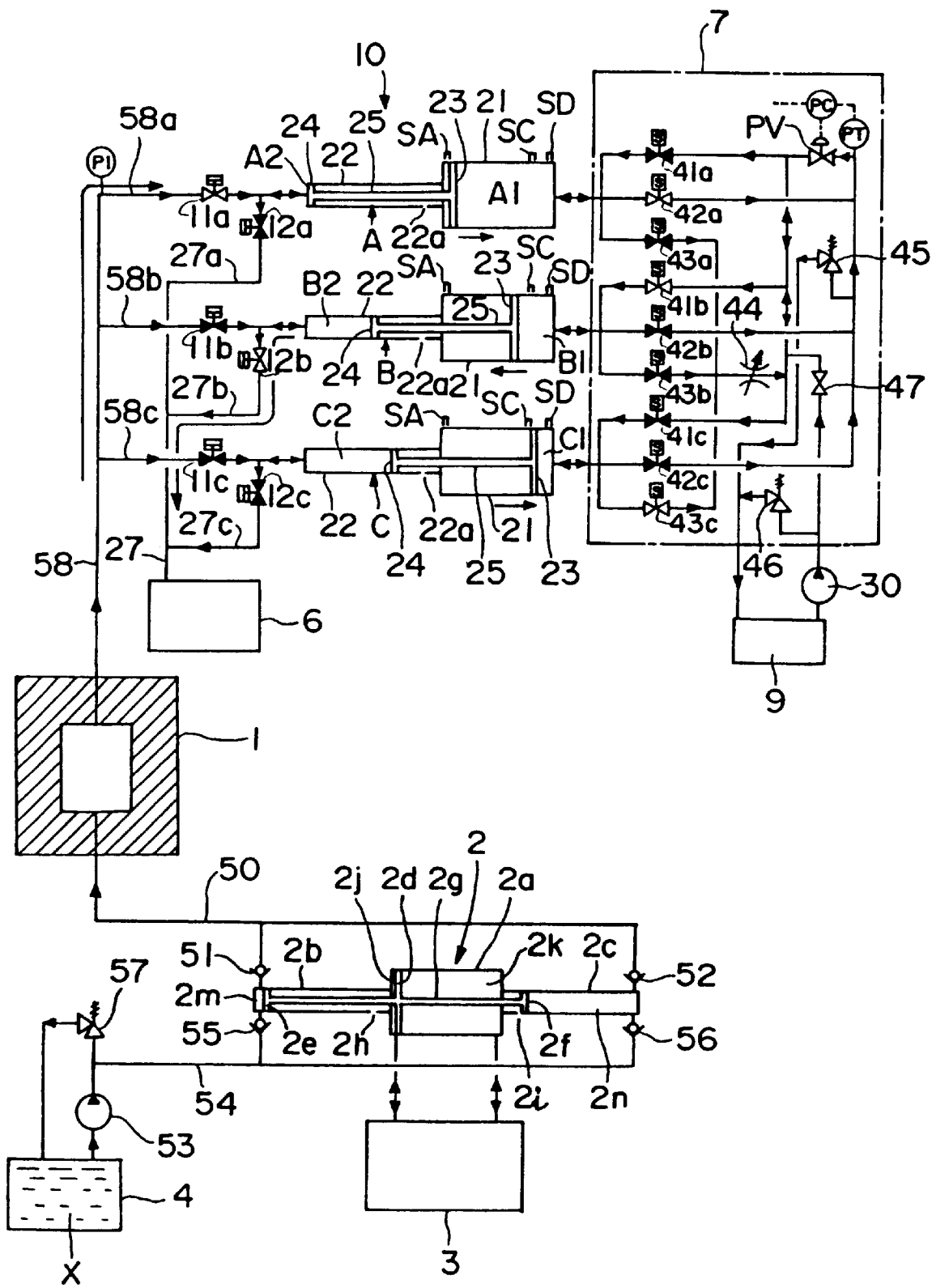
FIG. 1 is a schematic circuit diagram of an apparatus for processing a high-pressure liquid material according to a first embodiment of the present invention.

As shown in FIG. 1, the apparatus has a high-pressure vessel 1 with a pressurization chamber defined therein. The high-pressure vessel 1 is connected at one end thereof to a pressurizing means 2 in the form of a pump through a pipe 50. The pressurizing means 2 has a larger-diameter double-acting cylinder 2a and a pair of smaller-diameter cylinders 2b, 2c connected to respective opposite ends of the larger-diameter cylinder 2a. A larger-diameter piston 2d is slidably fitted in the larger-diameter cylinder 2a, and a pair of smaller-diameter pistons 2e, 2f is slidably fitted in the respective smaller-diameter cylinders 2b, 2c. The pistons 2d, 2e, 2f are coaxially connected to each other by a single piston rod 2g. The larger-diameter piston 2d divides the larger-diameter cylinder 2a into second pressure chambers 2j, 2k. The smaller-diameter cylinders 2b, 2c have respective air vent holes 2h, 2i defined in rod-end portions thereof. The smaller-diameter cylinders 2b, 2c have respective first pressure chambers 2m, 2n defined in cap-end portions thereof which are connected to the pipe 50 through respective check valves 51, 52 which permit a liquid flow from the pressurizing means 2 to the high-pressure vessel 1.

A liquid material tank 4 contains a liquid material X to be processed, such as a flowable food material, a flowable pharmaceutical material, or the like. When a pump 53 connected to the liquid material tank 4 operates, the liquid material X contained in the liquid material tank 4 flows into a pipe 54 and is then drawn into one of the first pressure chambers 2m, 2n. The first pressure chambers 2m, 2n are connected to the liquid material tank 4 through respective check valves 55, 56 which permit a liquid flow from the liquid material tank 4 to the pressurizing means 2. A relief valve 57 is connected to the pipe 54 for limiting a maximum pressure in the pipe 54.

When working oil is supplied under high pressure from an actuating hydraulic unit 3 to one of the second pressure chambers 2j, 2k while working oil is being discharged from the other of the second pressure chambers 2j, 2k, the liquid material X is supplied from the liquid material tank 4 to one of the first pressure chambers 2m, 2n through the corresponding one of the check valves 55, 56. Then, when the working oil is supplied under high pressure from the actuating hydraulic unit 3 to the other of the second pressure chambers 2j, 2k, the liquid material X is discharged from one of the first pressure chambers 2m, 2n through the corresponding one of the check valves 51, 52 and the pipe 50 into the pressurization chamber in the high-pressure vessel 1. The high-pressure vessel 1 processes the supplied liquid material X under a high pressure in the pressurization chamber. The high-pressure vessel 1 can be supplied with successive amounts of liquid material X in timed relation to suction modes of respective depressurizing devices A, B, C (described below).

The other end of the high-pressure vessel 1 is connected through a pipe 58 to a depressurizing means 10 which comprises three independently operable depressurizing devices A, B, C connected parallel to each other. The depressurizing devices A, B, C comprise respective pressure intensifiers each in the form of a cylinder assembly having a larger-diameter cylinder 21 and a smaller-diameter cylinder 22 connected to one end of the larger-diameter cylinder 21. The depressurizing devices A, B, C have respective larger-diameter pistons 23 slidably fitted in the respective larger-diameter cylinders 21 and respective smaller-diameter pistons 24 slidably fitted in the respective smaller-diameter cylinders 22. The larger-diameter pistons 23 and the smaller-diameter pistons 24 are coaxially connected to each other by respective piston rods 25. The larger-diameter pistons 23 define respective third pressure chambers A1, B1, C1 in cap-end portions of the respective larger-diameter cylinders 21, the third pressure chambers A1, B1, C1 serving as working pressure chambers. The smaller-diameter pistons 24 define respective fourth pressure chambers A2, B2, C2 in cap-end portions of the respective smaller-diameter cylinders 22, the fourth pressure chambers A2, B2, C2 serving as pressure chambers for processing the liquid material X. The smaller-diameter cylinders 22 have respective air vent holes 22a defined in rod-end portions thereof.

The larger-diameter cylinders 21 have respective discharge-position limit switches SA for detecting when the larger-diameter pistons 23 have reached a predetermined advanced position, i.e., a left end position in FIG. 1, respective suction-position limit switches SC for detecting when the larger-diameter pistons 23 have reached a predetermined retracted position, i.e., a right position in FIG. 1, and respective depressurization-position limit switches SD for detecting when the larger-diameter pistons 23 have reached a most retracted position, i.e., a right end position in FIG. 1. The depressurization-position limit switches SD may be dispensed with, and pressure detectors may be connected to pipes joined to the larger-diameter cylinders 21 for detecting the completion of a depressurization mode for depressurizing the liquid material X based on a detected pressure.

In the advanced position reached by the larger-diameter pistons 23, a discharge mode for discharging the liquid material X is finished, and the larger-diameter pistons 23 have been advanced, leaving a pressurizable space in the larger-diameter cylinders 21. In the retracted position reached by the larger-diameter pistons 23, the liquid material X compressed under a high pressure which has been drawn into the respective fourth pressure chambers A2, B2, C2 is depressurized substantially to the atmospheric pressure and expanded in volume, permitting the larger-diameter pistons 23 to be retracted further to the right in FIG. 1. Specifically, when the larger-diameter pistons 23 have been retracted about 80 to 90% of their retractable distance in a suction mode for drawing the liquid material X, the suction-position limit switches SC are turned on. The depressurizing devices A, B, C finish the suction mode when the liquid material X compressed under a high pressure which has been drawn into the respective fourth pressure chambers A2, B2, C2 is depressurized substantially to the atmospheric pressure, so that the liquid material X is allowed to expand in volume. The depressurization-position limit switches SD detect the respective larger-diameter pistons 23 when the liquid material X has been depressurized substantially to the atmospheric pressure. Each of the limit switches SA, SC, SD may comprise an analog position detector.

The pipe 58 connected to the other end of the high-pressure vessel 1 is branched into three branch pipes 58a, 58b, 58c which are connected through respective shutoff valves 11a, 11b, 11c to the respective fourth pressure chambers A2, B2, C2 of the depressurizing devices A, B, C. Pipes 27a, 27b, 27c are branched from the respective branch pipes 58a, 58b, 58c at positions between the shutoff valves 11a, 11*b*, 11*c* and the fourth pressure chambers A2, B2, C2, and connected through respective shutoff valves 12*a*, 12*b*, 12*c* to a single pipe 27 that is connected to a product tank 6 for containing a product. The shutoff valves 11*a*, 11*b*, 11*c* and the shutoff valves 12*a*, 12*b*, 12*c* are automatically controlled so as to be selectively opened and closed by a controller (not shown). Under the control of the controller, the shutoff valves 11*a*, 11*b*, 11*c* and the shutoff valves 12*a*, 12*b*, 12*c* are selectively opened and closed to connect the single high-pressure vessel 1 selectively to the fourth pressure chambers A2, B2, C2 and also connect the product tank 6 selectively to the fourth pressure chambers A2, B2, C2.

The third pressure chambers A1, B1, C1 of the respective depressurizing devices A, B, C are connected to a working fluid control system 7 which can bring any one of the third pressure chambers A1, B1, C1 into communication with one or two of the other third pressure chambers for passing a working fluid, typically working oil under a relatively low pressure, thereto. The working fluid control system 7 serves to enable the depressurizing devices A, B, C to successively carry out the suction, depressurization, and discharge modes for drawing, depressurizing, and discharging the liquid material X. The working fluid control system 7 comprises a plurality of shutoff valves 41*a*, 41*b*, 41*c*, 42*a*, 42*b*, 42*c*, 43*a*, 43*b*, 43*c*, a variable restrictor 44, a pressure control valve PV, and a relief valve 45 which are connected as shown in FIG. 1. The pressure control valve PV comprises a pressure-reducing valve whose pressure setting can be controlled by a pressure controller PC based on an upstream pressure that is detected by a pressure transfer unit PT. To the working fluid control system 7, there are connected a pump 30 and a working fluid tank 9 through a relief valve 46 and a pressure control valve 47. When the working fluid leaks out, the pump 30 is actuated to supplement a working from the working fluid tank 9 to the third pressure chambers A1, B1, C1.

The working fluid control system 7 has a first piping for supplying the working fluid from one of the third pressure chambers A1, B1, C1 of the respective depressurizing devices A, B, C which carries out the suction mode for drawing the liquid material X, after the working fluid has been depressurized by the pressure control valve PV, to another one of the third pressure chambers B1, C1, A1 of the respective depressurizing devices B, C, A which carries out the discharge mode for discharging the liquid material X, a second piping for supplying the working fluid from one of the third pressure chambers C1, A1, B1 of the respective depressurizing devices C, A, B which carries out the depressurization mode for depressurizing the liquid material X, after the working fluid has been depressurized by the restrictor 44, to another one of the third pressure chambers B1, C1, A1 of the respective depressurizing devices B, C, A which carries out the discharge mode for discharging the liquid material X, and a third piping for supplying the working fluid from one of the third pressure chambers A1, B1, C1 of the respective depressurizing devices A, B, C which carries out the suction mode for drawing the liquid material X, without passage through the pressure control valve PV and the restrictor 44, directly to another one of the third pressure chambers B1, C1, A1 of the respective depressurizing devices B, C, A which has completed the discharge mode.

Figure 4:
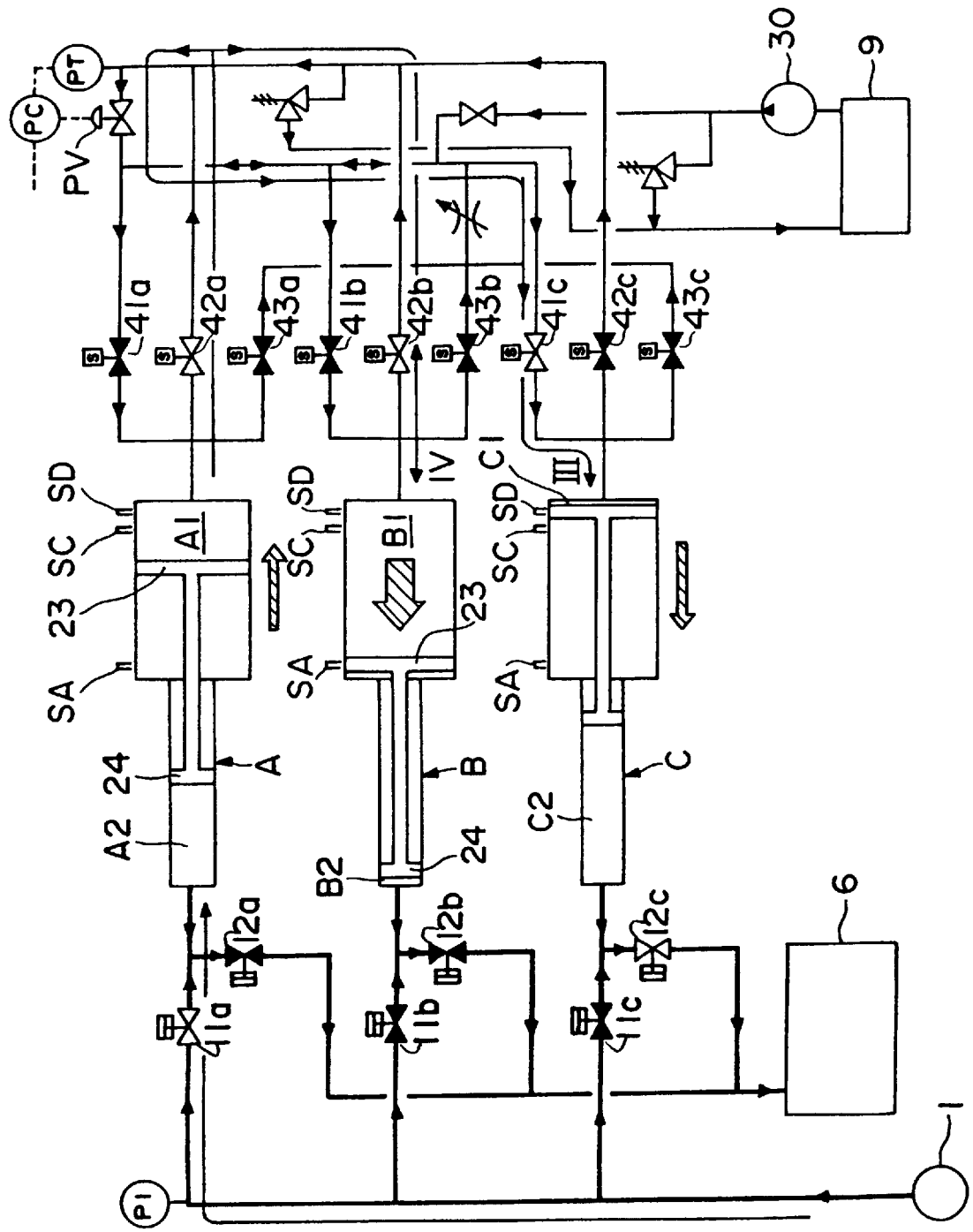
FIG. 4 is a schematic circuit diagram showing a third stage of operation of the central portion of the apparatus, following the second stage of operation shown in FIG. 3.

Specifically, to connect any one of the third pressure chambers A1, B1, C1 to the other two of the third pressure chambers A1, B1, C1, the shutoff valves 42*a*, 41*b*, 43*c*, for example, which are shown blank in FIG. 1, are opened to supply the working fluid from the third pressure chamber A1 through the shutoff valve 42*a*, the pressure control valve PV, and the shutoff valve 41*b* to the third pressure chamber B1, and also to supply the working fluid from the third pressure chamber C1 through the shutoff valve 43*c*, the restrictor 44, and the shutoff valve 41*b* to the third pressure chamber B1. In this case, the liquid material X is drawn into the fourth pressure chamber A2, the liquid material X is discharged from the fourth pressure chamber B2 into the product tank 6, and the liquid material X in the fourth pressure chamber C2 is depressurized. The shutoff valves 42*a*, 42*b*, for example, which are shown blank in FIG. 4, are opened to supply the working fluid from the third pressure chamber A1 directly to the third pressure chamber B1 which has completed the discharge mode. In this case, the liquid material X in the fourth pressure chamber B2 is pressurized.

In the event of an abnormal pressure buildup of the working fluid in the third pressure chambers A1, B1, C1 of the depressurizing devices A, B, C in the suction mode, the working fluid is drained through the relief valve 45 to the working fluid tank 9. In the event of an abnormal pressure buildup of the working fluid supplied from the pump 30 through the pressure control valve 47 to the third pressure chambers A1, B1, C1, the working fluid is drained through the relief valve 46 to the working fluid tank 9. When the pump 30 is actuated, the working fluid from the working fluid tank 9 can be supplemented through the pressure control valve 47 to the working fluid control system 7. Specifically, the working fluid is supplemented to the third pressure chambers B1, C1, A1 of the depressurizing devices B, C, A in the discharge mode by opening the shutoff valves 41*a*, 41*b*, 41*c*. To this end, the larger-diameter cylinders 21 may have respective intermediate-position limit switches SB for detecting when the larger-diameter pistons 23 are in an intermediate position in the larger-diameter cylinders 21.

As described above, the depressurizing devices A, B, C comprise respective pressure intensifiers with the third pressure chambers A1, B1, C1 defined in the larger-diameter cylinder 21 by the larger-diameter pistons 23 and with the fourth pressure chambers A2, B2, C2 defined in the smaller-diameter cylinders 22 by the smaller-diameter pistons 24. This arrangement allows the working fluid, typically working oil under a relatively low pressure, to process the liquid material X which is of a pressure several times to several tens of times the pressure of the working fluid.

Operation of the apparatus for processing a high-pressure liquid material according to the first embodiment of the present invention will be described below.

Figure 2:
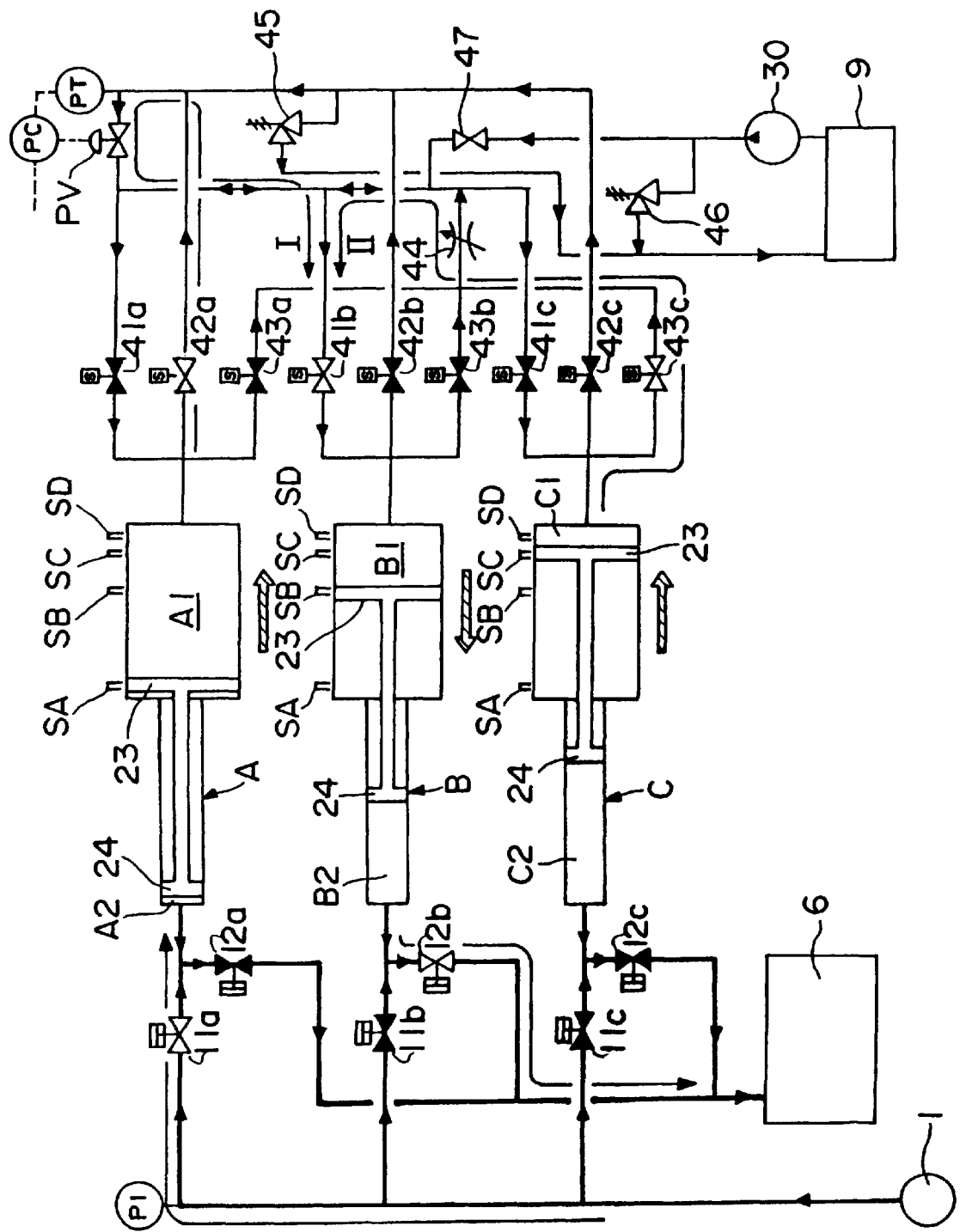
FIG. 2 is a schematic circuit diagram showing a first stage of operation of a central portion of the apparatus shown in FIG. 1.

It is assumed that the depressurizing devices A, B, C are initially in a first stage of operation as shown in FIG. 2. Specifically, the fourth pressure chamber A2 of the depressurizing device A starts the suction mode, and the fourth pressure chamber B2 of the depressurizing device B is carrying out the discharge mode after having been filled up with and depressurized the liquid material X. The fourth pressure chamber C2 of the depressurizing device C starts the depressurization mode after having been filled up with the liquid material X. The suction mode is a mode for drawing the liquid material X that has been pressurized to a certain pressure in the high-pressure vessel 1 into the fourth pressure chambers A2, B2, C2. The discharge mode is a mode for discharging the liquid material X that has been depressurized substantially to the atmospheric pressure from the fourth pressure chambers B2, C2, A2 to the product tank 6. The depressurization mode is a mode for depressurizing the liquid material X that has been drawn under pressure into the fourth pressure chambers C2, A2, B2 substantially to the atmospheric pressure. The pressurizing means 2 (see FIG. 1) supplies the liquid material X in successive amounts to the high-pressure vessel 1 in timed relation to suction modes carried out by the depressurizing devices A, B, C.

Specifically, the shutoff valves 11a, 12b, 42a, 41b, 43c, shown blank in FIG. 2, are opened. The depressurizing device A in the suction mode starts to receive the liquid material X from the high-pressure vessel 1 through the shutoff valve 11a into the fourth pressure chamber A2 while retracting the pistons 23, 24, i.e., moving them to the right in FIG. 2. At this time, the working fluid in the third pressure chamber A1 flows through the shutoff valve 42a and the pressure control valve PV as indicated by the arrow I in FIG. 2, during which time the working fluid is depressurized, and then the working fluid is supplied through the shutoff valve 41b into the third pressure chamber B1 of the depressurizing device B which is in the discharge mode. The pistons 23, 24 of the depressurizing device B are advanced, i.e., displaced to the left in FIG. 2, for thereby discharging the liquid material X which has been depressurized substantially to the atmospheric pressure from the fourth pressure chamber B2 through the shutoff valve 12b into the product tank 6. Those shutoff valves which are shown solid in FIG. 2 are closed.

In the depressurizing device C which is in the depressurization mode, the liquid material X in the fourth pressure chamber C2 is expanded in volume and depressurized, retracting or moving the pistons 23, 24 to the right thereby to reduce the volume of the third pressure chamber C1. As the third pressure chamber C1 is contracted, the working fluid flows from the third pressure chamber C1 through the shutoff valve 43c, the restrictor 44, and the shutoff valve 41b as indicated by the arrow II into the third pressure chamber B1 of the depressurizing device B which is operating in the discharge mode. In this manner, the discharge mode is carried out by the depressurizing device B while being supplied with the working fluid from the third pressure chamber A1 of the depressurizing device A and the third pressure chamber C1 of the depressurizing device C.

Figure 3:
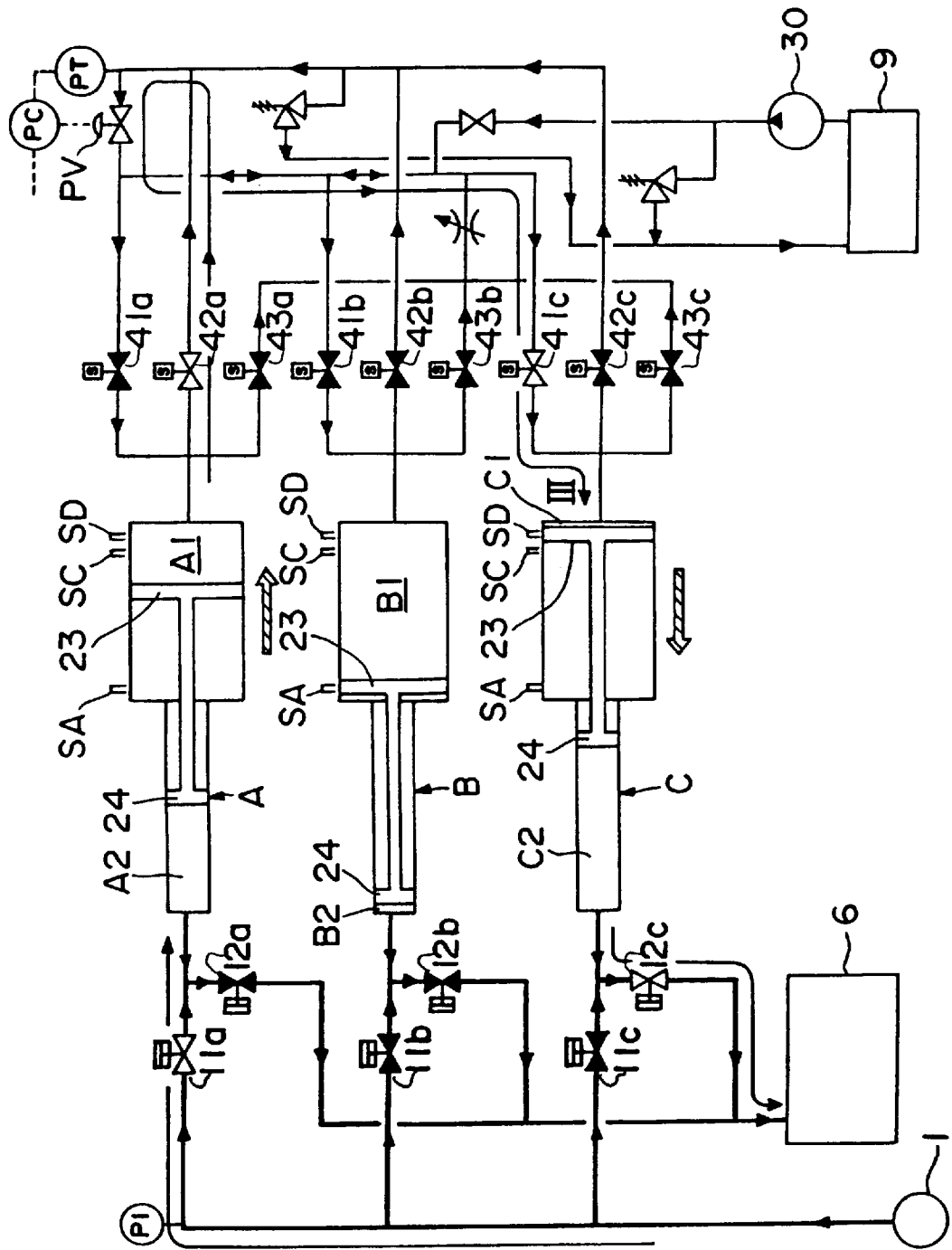
FIG. 3 is a schematic circuit diagram showing a second stage of operation of the central portion of the apparatus, following the first stage of operation shown in FIG. 2.

FIG. 3 shows a second stage of operation which follows the first stage of operation shown in FIG. 2. In the second stage of operation shown in FIG. 3, the discharge mode of the depressurizing device B and the depressurization mode of the depressurizing device C are completed. At this time, the larger-diameter piston 23 of the depressurizing device B is detected by the discharge-position limit switch SA, and the larger-diameter piston 23 of the depressurizing device C is detected by the depressurization-position limit switch SD. Based on signals from these limit switches SA, SD, the shutoff valves 12b, 41b, 43c are closed, and the shutoff valves 12c, 41c are opened, switching the depressurizing device C into the discharge mode. The depressurizing device A continuously carries out the suction mode, forcing the working fluid from the third pressure chamber A1 thereof through the shutoff valve 42a and the pressure control valve PV as indicated by the arrow III in FIG. 2, during which time the working fluid is depressurized, and then the working fluid is supplied through the shutoff valve 41c into the third pressure chamber C1 of the depressurizing device C which is now in the discharge mode. The liquid material X in the fourth pressure chamber C2, which has been depressurized in the depressurization mode, starts being discharged from the fourth pressure chamber C2 through the shutoff valve 12c into the product tank 6. If the depressurization mode of the depressurizing device C is completed prior to the completion of the discharge mode of the depressurizing device B, then the completion of the depressurization mode is detected by the depressurization-position limit switch SD, which then closes the shutoff valve 43c.

FIG. 4 shows a third stage of operation which follows the second stage of operation shown in FIG. 3. In the third stage of operation shown in FIG. 4, the shutoff valve 42b is opened to introduce the working fluid discharged from the third pressure chamber A1 through the shutoff valves 42a, 42b into the third pressure chamber B1 as indicated by the arrow IV while the working fluid is being maintained under substantially the same pressure. The working fluid thus supplied to the third pressure chamber B1 pressurizes the third pressure chamber B1 and also the fourth pressure chamber B2, imposing a back pressure on the pistons 23, 24 of the depressurizing device B to place the depressurizing device B into readiness for the suction mode, i.e., to operate the depressurizing device B in a pressurization mode. Since the back pressure applied in this pressurization mode is produced by the working fluid that is discharged from the third pressure chamber A1 and supplied directly to the third pressure chamber B1 without passage through the pressure control valve PV, the back pressure substantially counterbalances the high pressure of the liquid material X from the high-pressure vessel 1. The end of the pressurization mode may be detected by pressure detectors connected to the pipes connected to the larger-diameter cylinders 21 when the pressure detectors detect a predetermined pressure buildup therein.

Figure 5:
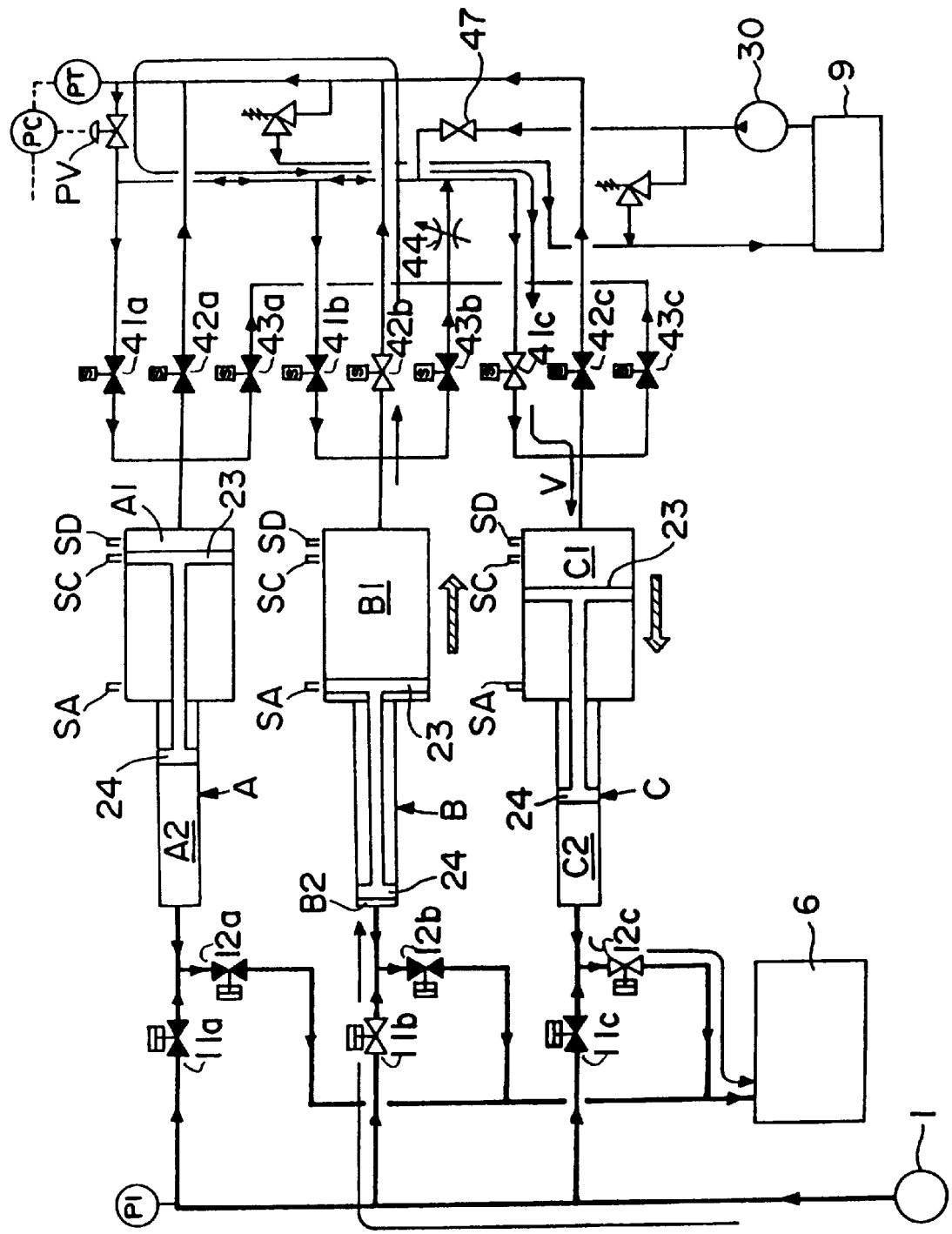
FIG. 5 is a schematic circuit diagram showing a fourth stage of operation of the central portion of the apparatus, following the third stage of operation shown in FIG. 4.

Upon detection by the suction-position limit switch SC of the larger-diameter piston 23 of the depressurizing device A, the apparatus enters a fourth stage of operation shown in FIG. 5 which follows the third stage of operation shown in FIG. 4. In the fourth stage of operation shown in FIG. 5, the shutoff valves 11a, 42a are closed, and the shutoff valve 11b is opened. The depressurizing device A ends the suction mode, the depressurizing device B starts the suction mode with the shutoff valve 42b open, and the depressurizing device C continues the discharge mode. Since the back pressure which substantially counterbalances the high pressure of the liquid material X from the high-pressure vessel 1 has been applied to the pistons 23, 24 of the depressurizing device B in the pressurization mode prior to the suction mode, the pistons 23, 24 are substantially free of any appreciable differential pressures thereacross when the shutoff valve lib is opened to start the suction mode of the depressurizing device B. Consequently, the valve seat of the shutoff valve 11b is prevented from being damaged. When the high-pressure liquid material X then flows from the high-pressure vessel 1 into the fourth pressure chamber B2, no undue pressure shock is applied to the pressure control valve PV, the shutoff valves 42a, 42c, and the associated pipes, and hence the durability of these components is not lowered. The working fluid flowing out of the third pressure chamber B1 is supplied through the shutoff valve 42b, the pressure control valve PV, and the shutoff valve 41c into the third pressure chamber C1 as indicated by the arrow V in FIG. 5.

Now, the depressurizing device B starts the suction mode with its fourth pressure chamber B2, the depressurizing device C carries out the discharge mode with its fourth pressure chamber C2, and the depressurizing device A starts the depressurization mode as the liquid material X has been drawn and filled in the fourth pressure chamber A2. Thereafter, substantially the same operation as described above is repeated by the depressurizing device B which operates in the same manner as the depressurizing device A described above, the depressurizing device C which operates in the same manner as the depressurizing device B described above, and the depressurizing device A which operates in the same manner as the depressurizing device C described above. When the above operation is repeated three times, one cycle of operation is finished. The various modes are carried out simply by the working fluid which moves between the third pressure chambers A1, B1, C1 of the depressurizing devices A, B, C while effectively utilizing the pressure of the liquid material X acting in the suction and depressurization modes as forces to actuate the depressurizing devices A, B, C.

If the working fluid leaks in a small quantity from the working fluid control system 7 or the third pressure chambers A1, B1, C1 and hence is reduced in amount, then the pump 30 is actuated to supplement the working fluid from the working fluid tank 9 through the pressure control valve 47 into the working fluid control system 7. A leakage of the working fluid is recognized when the larger-diameter piston 23 of the depressurizing device B passes undetected by the intermediate-position limit switch SB in the first stage of operation shown in FIG. 2. Even when the working fluid leaks out, only the larger-diameter pistons 23 move to the right, and such a leakage poses no problem if the depressurization mode suffers no failure. Therefore, the working fluid may be supplemented to make up for a leakage at suitable times, but not at frequent intervals.

In the above embodiment, when the fourth pressure chamber A2 of the depressurizing device A starts the suction mode and the fourth pressure chamber C2 of the depressurizing device C starts the depressurization mode, the depressurizing device B has already carried out the discharge mode. The time required for the depressurizing device C to effect the depressurization mode can be adjusted, i.e., increased or reduced, by adjusting the rate at which the discharge mode is in progress. A longest time can be given to the depressurization mode when the suction mode, the discharge mode, and the depressurization mode are started simultaneously, and the longest time required for the depressurization mode is the same as the time required for the discharge mode. The longest time required for the depressurization mode is preferably determined as an appropriate and sufficient time depending on the type of the liquid material X, so as to allow the depressurization mode to be conducted slowly to keep a desired level of operation efficiency for the suction mode, the discharge mode, and the depressurization mode and also to effectively sterilize the liquid material X under a high pressure while controlling changes in the properties and flavor of the liquid material X. The time required for the depressurization mode is adjusted by adjusting the variable restrictor 44 for varying the rate of flow therethrough. The time required for the discharge mode may be adjusted by carrying out the depressurization mode synchronously with the suction mode or carrying out the depressurization mode after the suction mode is finished.

Figure 6:
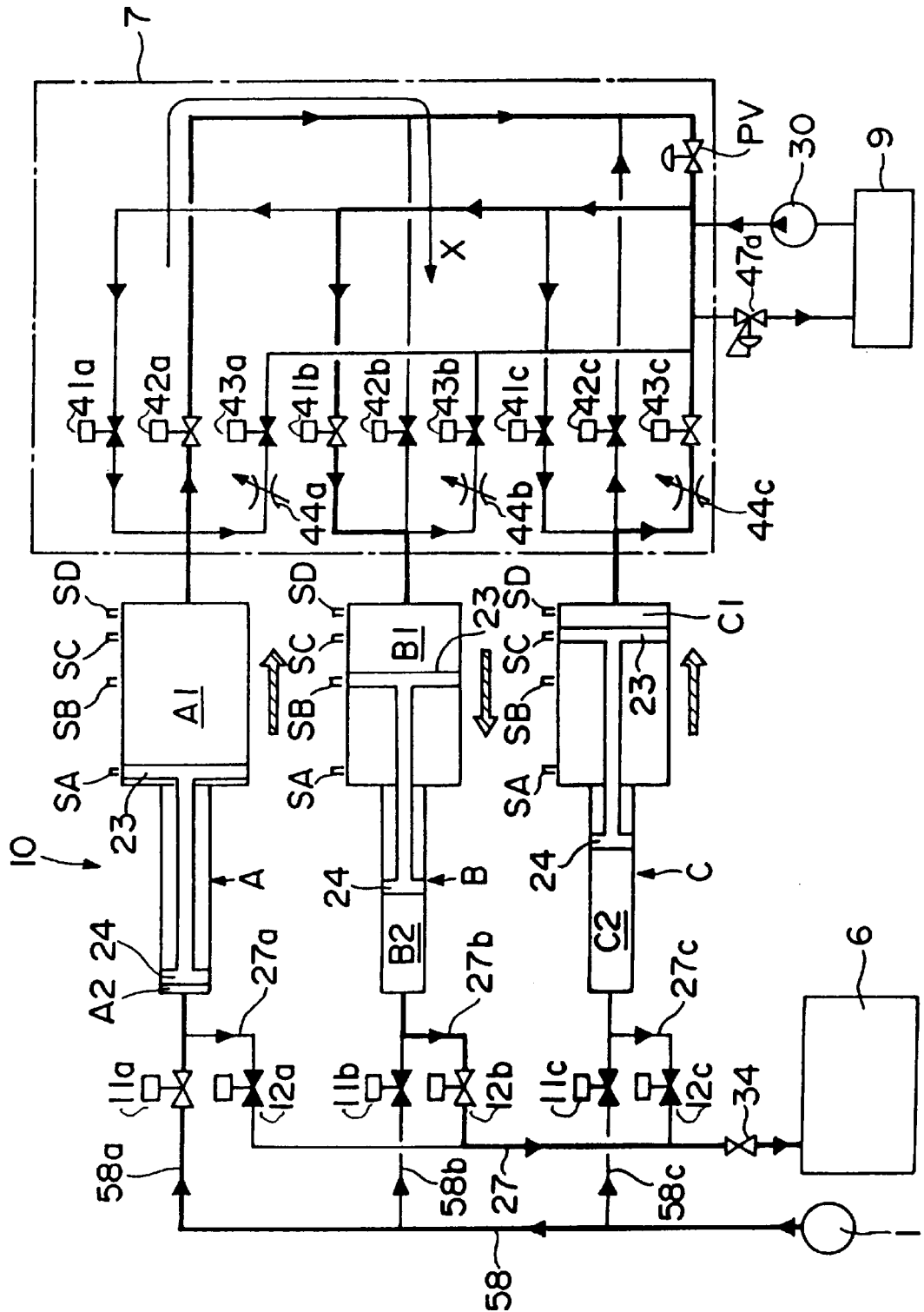
FIG. 6 is a schematic circuit diagram of a modification of a working fluid control system in the central portion of the apparatus shown in FIG. 1.

FIG. 6 shows a modification of the working fluid control system 7 connected to the third pressure chambers A1, B1, C1 of the depressurizing devices A, B, C. Those parts shown in FIG. 6 which are identical to those parts shown in FIGS. 1 through 5 are denoted by identical reference numerals. However, the relief valves 45, 46 as safety valves are omitted from illustration. As shown in FIG. 6, a pressure control valve 47a is connected between the working fluid tank 9 and a low-pressure side of the working fluid control system 7, i.e., a side of the working fluid control system 7 which is lower in pressure than the pressure control valve PV. The pressure control valve 47a is capable of maintaining a lower pressure in the working fluid control system 7. In the modification shown in FIG. 6, variable restrictors 44a, 44b, 44c are connected respectively to the third pressure chambers A1, B1, C1 in series with the shutoff valves 43a, 43b, 43c, respectively. The pipe 27 has a pressure-reducing valve 34 for imparting a slight pressure to the liquid material X in the fourth pressure chambers A2, B2, C2 to minimize any shock-induced movement of the pistons 23, 24 at the time the liquid material X is discharged from the fourth pressure chambers A2, B2, C2.

The working fluid control system 7 shown in FIG. 6 has a first piping for supplying the working fluid from the third pressure chamber A1 (B1, C1) of the depressurizing device A (B, C) which carries out the suction mode for drawing the liquid material X, after the working fluid has been depressurized by the pressure control valve PV, to the third pressure chamber B1 (C1, A1) of the depressurizing device B (C, A) which carries out the discharge mode for discharging the liquid material X, a second piping for supplying the working fluid from the third pressure chamber C1 (A1, B1) of the depressurizing device C (A, B) which carries out the depressurization mode for depressurizing the liquid material X, after the working fluid has been depressurized by the restrictor 44c (44a, 44b), to the third pressure chamber B1 (C1, A1) of the depressurizing device B (C, A) which carries out the discharge mode for discharging the liquid material X, and a third piping for supplying the working fluid from the third pressure chamber A1 (B1, C1) of the depressurizing device A (B, C) which carries out the suction mode for drawing the liquid material X, without passage through the pressure control valve PV and the restrictor 44a (44b, 44c), directly, as indicated by the arrow X, to the third pressure chamber B1 (C1, A1) of the depressurizing device B (C, A) which has completed the discharge mode. The working fluid in the third pressure chamber A1 (B1, C1) of the depressurizing device A (B, C) which carries out the suction mode may be withdrawn through the pressure control valve 47a into the working fluid tank 9.

The first piping specifically supplies the working fluid from the third pressure chamber A1 (B1, C1) of the depressurizing device A (B, C) which carries out the suction mode, after the working fluid has been depressurized by the shutoff valve 42a (42b, 42c) and the pressure control valve PV, to the third pressure chamber B1 (C1, A1) of the depressurizing device B (C, A) which carries out the discharge mode, through the shutoff valve 41b (41c, 41a). The second pipe specifically supplies the working fluid from the third pressure chamber C1 (A1, B1) the depressurizing device C (A, B) which carries out the depressurization mode, after the working fluid has been depressurized by the restrictor 44c (44a, 44b) and the shutoff valve 43c (43a, 43b), to the third pressure chamber B1 (C1, A1) of the depressurizing device B (C, A) which carries out the discharge mode, through the shutoff valve 41b (41c, 41a). The third pipe specifically supplies the working fluid from the third pressure chamber A1 (B1, C1) of the depressurizing device A (B, C) which carries out the suction mode, without passage through the pressure control valve PV and the restrictor 44a (44b, 44c), directly to the third pressure chamber B1 (C1, A1) of the depressurizing device B (C, A) which has completed the discharge mode, through the shutoff valve 42b (42c, 42a).

Figure 7:
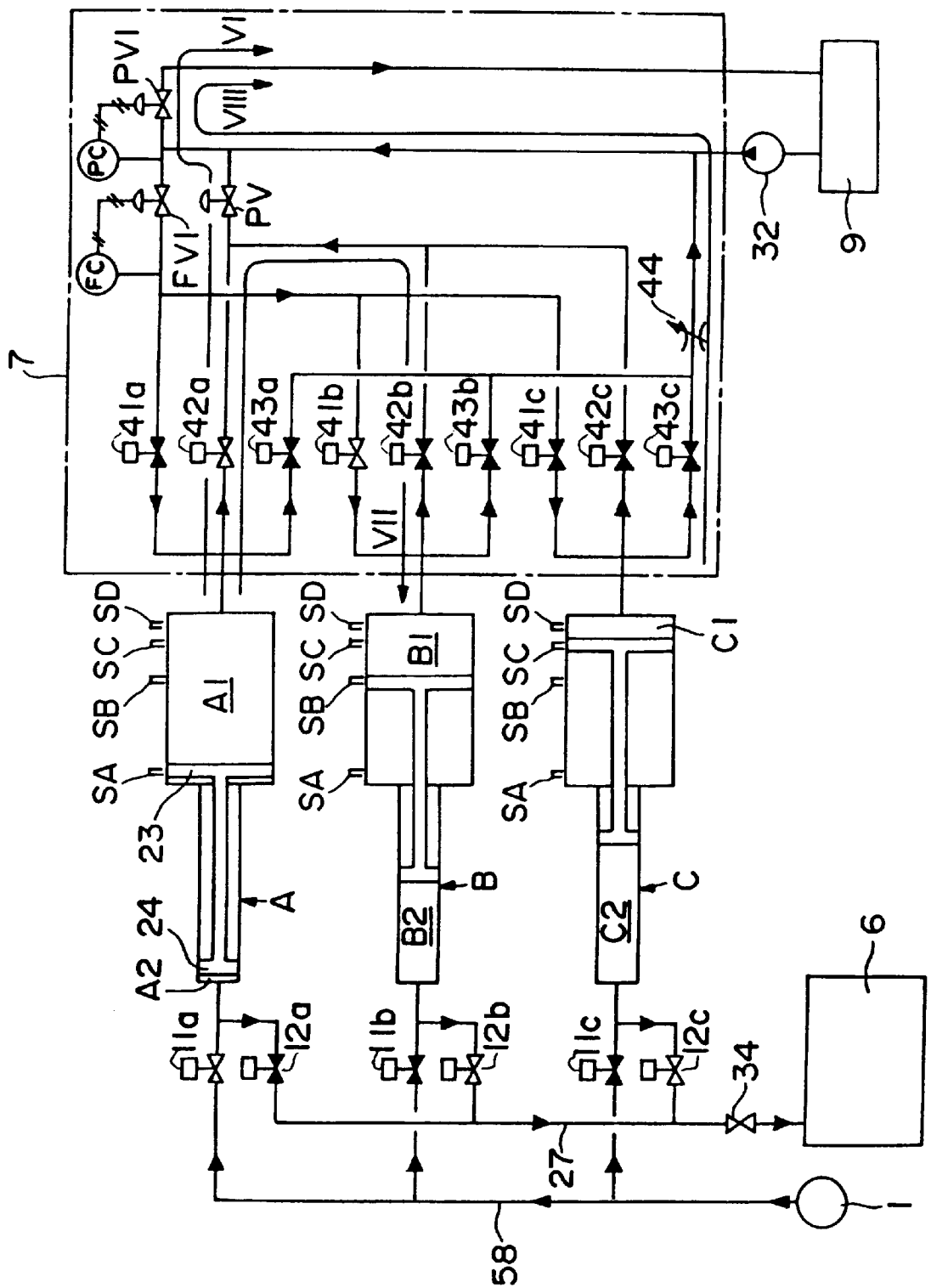
FIG. 7 is a schematic circuit diagram of another modification of the working fluid control system in the central portion of the apparatus shown in FIG. 1.

FIG. 7 shows another modification of the working fluid control system 7 connected to the third pressure chambers A1, B1, C1 of the depressurizing devices A, B, C. Those parts shown in FIG. 7 which are identical to those parts shown in FIGS. 1 through 5 are denoted by identical reference numerals. As shown in FIG. 7, when a pump 32 is actuated, the working fluid in the working fluid tank 9 can be supplied under a given pressure to the third pressure chambers A1, B1, C1 through a flow control valve FV1 and the shutoff valves 41a, 41b, 41c. When the pump 32 is actuated, the flow control valve FV1 supplies the working fluid through the shutoff valves 41a, 41b, 41c to the third pressure chambers A1, B1, C1 at a predetermined rate under a relatively low secondary pressure (downstream pressure) so that the liquid material X can be discharged from the fourth pressure chambers A2, B2, C2.

In the discharge mode of any one of the depressurizing devices A, B, C, a pressure control valve PV1 controls the working fluid supplied from the working fluid tank 9 by the pump 32 to flow through the flow control valve FV1 under a constant pressure, and returns the working fluid back to the working fluid tank 9 if the pressure of the working fluid exceeds a certain pressure level.

When the fourth pressure chambers A2, B2, C2 draws the liquid material X in the suction mode, the pressure control valve PV depressurizes the working fluid discharged from the third pressure chambers A1, B1, C1 through the shutoff valves 42a, 42b, 42c, and returns the depressurized working fluid through the pressure control valve PV1 back to the working fluid tank 9.

When the fourth pressure chambers A2, B2, C2 depressurize the liquid material X in the depressurization mode, the restrictor 44 gives a suitable resistance to the working fluid flowing out of the third pressure chambers A1, B1, C1. The working fluid that has passed through the restrictor 44 returns through the pressure control valve PV1 back to the working fluid tank 9.

The intermediate-position limit switches SB serve to detect when the larger-diameter pistons 23 of the depressurizing devices A, B, C have reached the intermediate position in the larger-diameter cylinders 21. The intermediate-position limit switches SB are positioned such that the larger-diameter piston 23 of the depressurizing device A, for example, is detected by the corresponding intermediate-position limit switch SB when the larger-diameter piston 23 of the depressurizing device C is in the most retracted position, turning on the corresponding depressurization-position limit switch SD (or the pressure detector connected to the pipe connected to the larger-diameter cylinder 21), and also when the larger-diameter piston 23 of the depressurizing device B turns on the discharge-position limit switch SA. The pressure controller PC controls the pressure setting for the pressure control valve PV1 based on the detected pressure, and a flow controller FC controls the flow rate setting for the flow control valve FV1 based on the detected flow rate.

When the liquid material X is drawn by the depressurizing device A in the suction mode, the working fluid from the third pressure chamber A1 returns through the shutoff valve 42a, the pressure control valve PV, and the pressure control valve PV1 back to the working fluid tank 9 as indicated by the arrow VI in FIG. 7. When the liquid material X is depressurized by the depressurizing device C in the depressurization mode, the working fluid from the third pressure chamber C1 returns through the shutoff valve 43c, the restrictor 44, and the pressure control valve PV1 back to the working fluid tank 9 as indicated by the arrow VIII in FIG. 7. At this time, the shutoff valves 41a, 41b, 41c, 42b, 42c, 43a, 43b remain closed. The third pressure chamber B1 of the depressurizing device B which effects the discharge mode is supplied with the working fluid from the working fluid tank 9 through the flow control valve FV1 and the shutoff valve 41b when the pump 32 is actuated.

The modified working fluid control system 7 shown in FIG. 7 differs from the working fluid control system 7 shown in FIG. 3 with respect to the stage of operation shown in FIG. 3 in that the third pressure chambers A1, B1, C1 and the fourth pressure chambers A2, B2, C2 of the depressurizing devices A, B, C are shifted from the modes shown in FIGS. 2 and 7 to the mode shown in FIG. 3. Specifically, when the completion of the discharge mode of the depressurizing device B is detected by the corresponding discharge-position limit switch SA, the shutoff valves 12b, 41b are closed, but the discharge mode of the depressurizing device C is not started. When the depressurization mode of the depressurizing device C is finished, the shutoff valve 43c is closed to keep the third pressure chamber C1 thereof as it is.

Thereafter, the working fluid discharged from the third pressure chamber A1 returns through the shutoff valve 42a, the pressure control valve PV, and the pressure control valve PV1 back to the working fluid tank 9 as indicated by the arrow VI in FIG. 7. However, the third pressure chamber B1 of the depressurizing device B may be pressurized in preparation for the next mode of operation by opening the shutoff valve 42b to supply the working fluid as indicated by the arrow VII in FIG. 7 to the third pressure chamber B1 when the larger-diameter piston 23 of the depressurizing device B is detected by the discharge-position limit switch SA. The end of the pressurization mode may be detected by pressure detectors connected to the pipes connected to the larger-diameter cylinders 21 when the pressure detectors detect a predetermined pressure buildup therein.

The discharge mode of the depressurizing device C is started when the larger-diameter piston 23 of the depressurizing device A has reached the predetermined intermediate position in the larger-diameter cylinder 21 as detected by the intermediate-position limit switch SB. When the larger-diameter piston 23 of the depressurizing device A has reached the predetermined intermediate position, the third pressure chambers A1, B1, C1 of the depressurizing devices A, B, C are in the same stage of operation as the third stage of operation shown in FIG. 4. Subsequently, the apparatus operates in the same stage of operation as the fourth stage of operation shown in FIG. 5. At this time, the working fluid flowing from the third pressure chamber B1 of the depressurizing device B through the shutoff valve 42b returns through the pressure control valve PV and the pressure control valve PV1 back to the working fluid tank 9. The discharge mode of the depressurizing device C is carried out when the shutoff valve 41c opened and the working fluid in the working fluid tank 9 is supplied through the flow control valve FV1 and the shutoff valve 41c to the third pressure chamber C1 by the pump 32. In this manner, the total volume of the third pressure chambers A1, B1, C1 is maintained at a constant level in each suction mode.

When the liquid material X is drawn in the suction mode by the depressurizing devices A, B, C, the working fluid from the third pressure chambers A1, B1, C1 returns through the shutoff valves 42a, 42b, 42c and the pressure control valves PV, PV1 back to the working fluid tank 9. However, until the intermediate-position limit switches SB detect when the larger-diameter pistons 23 of the depressurizing devices A, C, C have reached the intermediate position, the shutoff valves 41b, 41c, 41a may be opened suitably to supply the working fluid tending to flow back to the working fluid tank 9 to the third pressure chambers B1, C1, A1 for effecting the discharge mode.

When the liquid material X is depressurized in the depressurization mode by the depressurizing devices C, A, B, the working fluid from the third pressure chambers C1, A1, B1 returns through the shutoff valves 43c, 43a, 43b, the restrictor 44, and the pressure control valve PV1 back to the working fluid tank 9. At this time, the shutoff valves 41a, 41b, 41c may be opened suitably to supply part or all of the working fluid tending to flow back to the working fluid tank 9 to the third pressure chambers B1, C1, A1 for effecting the discharge mode. If at least of the working fluid discharged in the suction mode or the depressurization mode is thus utilized for the discharge mode, then the burden on the pump 32 can be lessened as much as the amount of working fluid utilized for the discharge mode.

FIGS. 8 through 11 show a central portion of an apparatus for processing a high-pressure liquid material according to a second embodiment of the present invention. Those parts shown in FIGS. 8 through 11 which are identical to those parts shown in FIGS. 1 through 5 are denoted by identical reference numerals, and will not be described in detail below. In the second embodiment, the depressurizing means 10 comprises two depressurizing devices B, C, the working fluid control system 7 is identical to a portion of the working fluid control system 7 shown in FIG. 6, and the depressurizing device A and the shutoff valves 11$a$, 12$a$, 41$a$, 42$a$, 43$a$ associated therewith are dispensed with. The pump 30 is actuated at all times to apply a constant pressure to a low-pressure side of the working fluid control system 7, i.e., a side of the working fluid control system 7 which is lower in pressure than the pressure control valve PV, to supply the working oil under a low pressure at a constant rate to the pressurizing devices B, C in the discharge mode. The apparatus according to the second embodiment resides particularly in that the depressurizing means 10 comprises two depressurizing devices B, C for carrying out suction modes successively.

Figure 8:
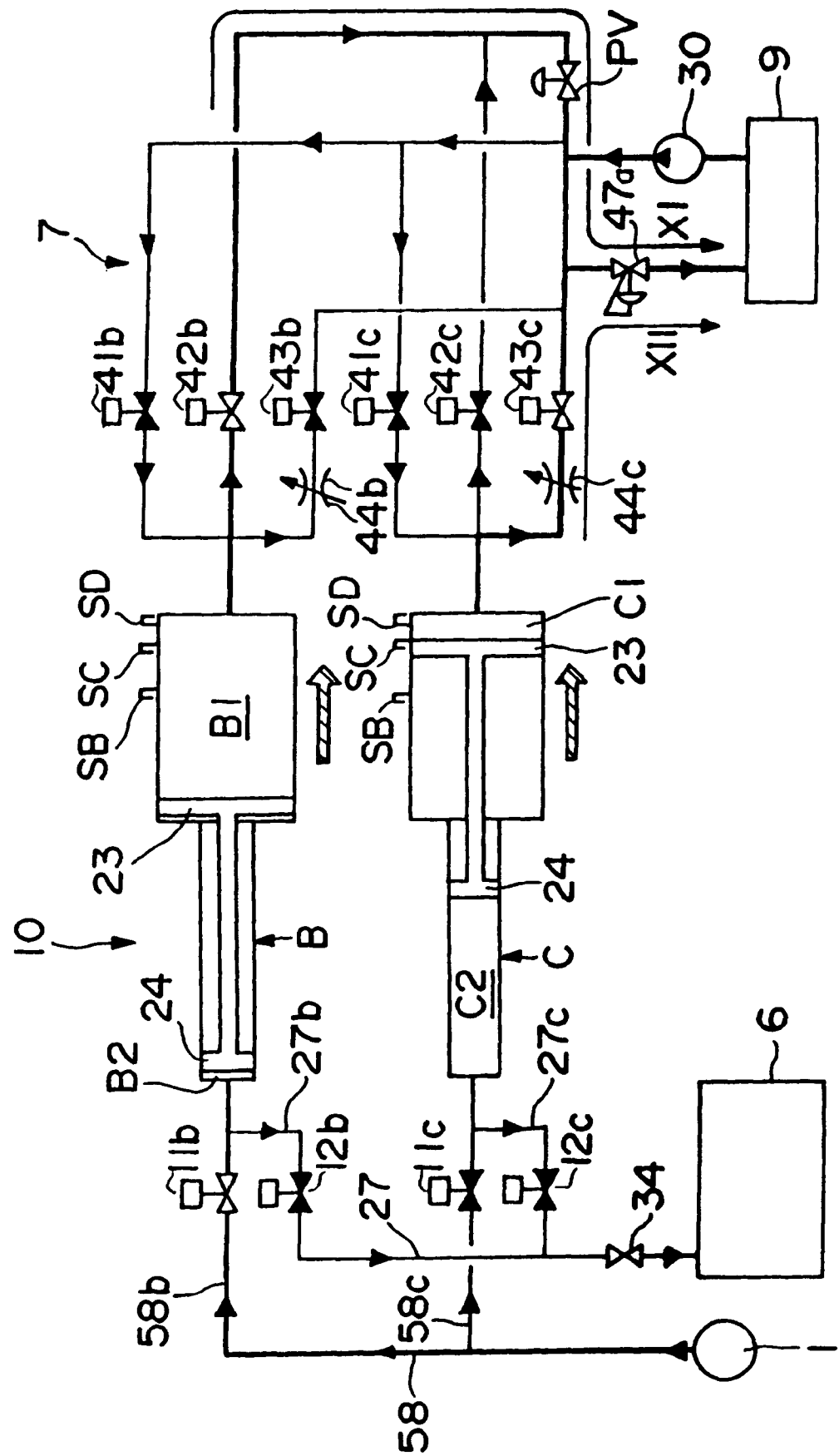
FIG. 8 is a schematic circuit diagram showing a first stage of operation of a central portion of an apparatus for processing a high-pressure liquid material according to a second embodiment of the present invention.

The suction modes are carried out successively by the apparatus according to the second embodiment as follows:

It is assumed that in a first stage of operation shown in FIG. 8, the fourth pressure chamber B2 of the depressurizing device B has finished the discharge and pressurization modes and is about to start the suction mode, and the fourth pressure chamber C2 of the depressurizing device C has finished the suction mode and is about to start the pressurization mode. Only the shutoff valves 11$b$, 42$b$, 43$c$, shown blank in FIG. 8, are opened, and the depressurizing device B in the suction mode starts receiving the liquid material X from the high-pressure vessel 1 into the fourth pressure chamber B2 while retracting its pistons 23, 24. At this time, the working fluid in the third pressure chamber B1 is depressurized by flowing through the shutoff valve 42$b$ and the pressure control valves PV, 47$a$ as indicated by the arrow XI in FIG. 8, and returns to the working fluid tank 9. In the depressurizing device C which operates in the depressurization mode, the high-pressure liquid material X in the fourth pressure chamber C2 is expanded in volume and depressurized, contracting the third pressure chamber C1. As the third pressure chamber C1 is contracted, the working fluid flows from the third pressure chamber C1 through the restrictor 44$c$, the shutoff valve 43$c$, and the pressure control valve 47$a$ back to the working fluid tank 9 as indicated by the arrow XII in FIG. 8.

Figure 9:
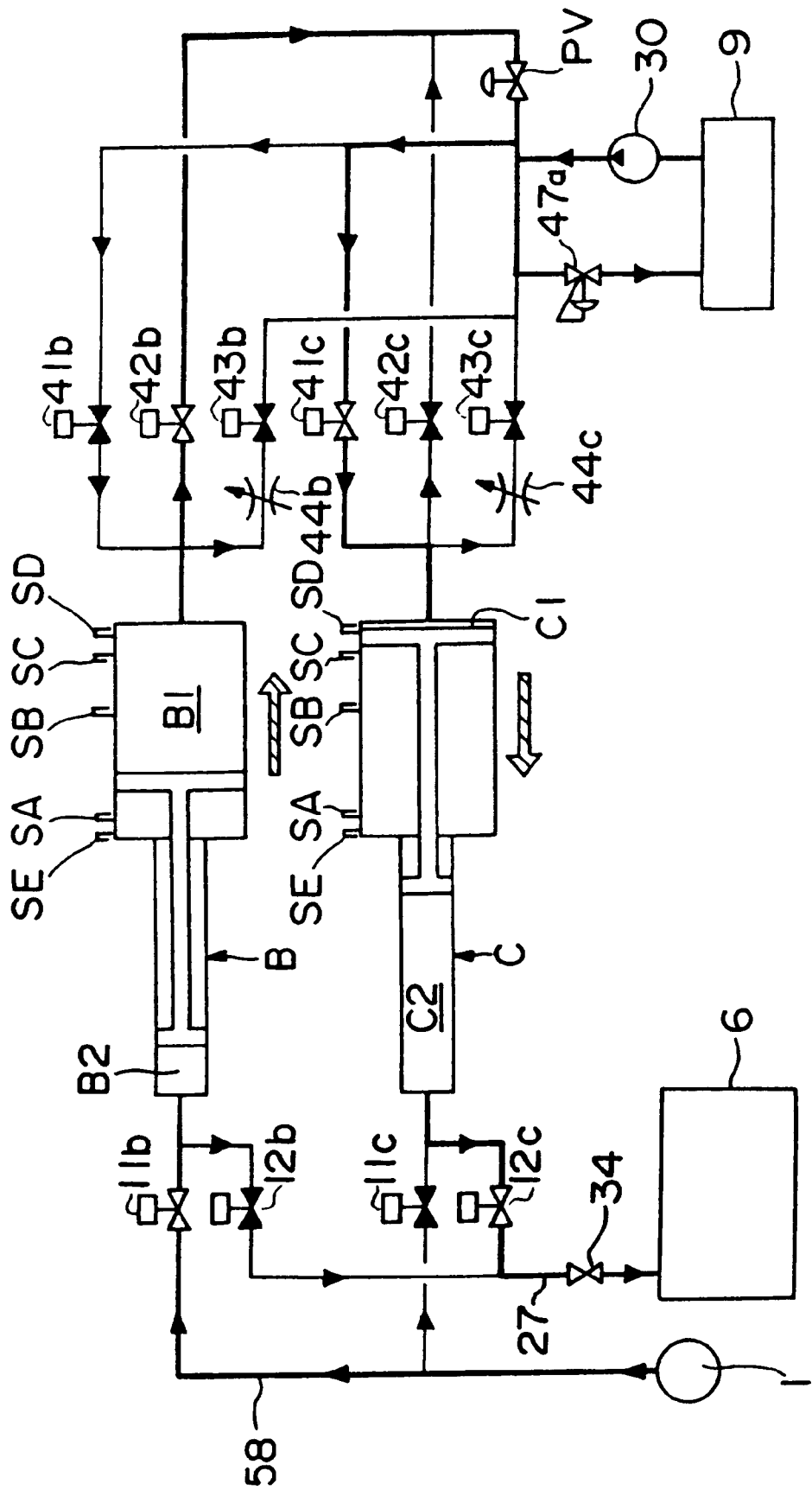
FIG. 9 is a schematic circuit diagram showing a second stage of operation of the central portion of the apparatus, following the first stage of operation shown in FIG. 8.

When the depressurization mode of the depressurizing device C is completed while the suction mode of the depressurizing device B is being continued in a second stage of operation shown in FIG. 9 which follows the first stage of operation shown in FIG. 8, the larger-diameter piston 23 of the depressurizing device C is detected by the depressurization-position limit switch SD. Based on a signal from the depressurization-position limit switch SD, the shutoff valve 43$c$ is closed and the shutoff valves 12$c$, 41$c$ are opened, bringing the depressurizing device C into the discharge mode. While the depressurizing device B is operating continuously in the suction mode, therefore, the working fluid principally from the pump 30 is supplied through the shutoff valve 41$c$ to the third pressure chamber C1, for thereby discharging the liquid material X that has been drawn and depressurized in the fourth pressure chamber C2 to the product tank 6.

Figure 10:
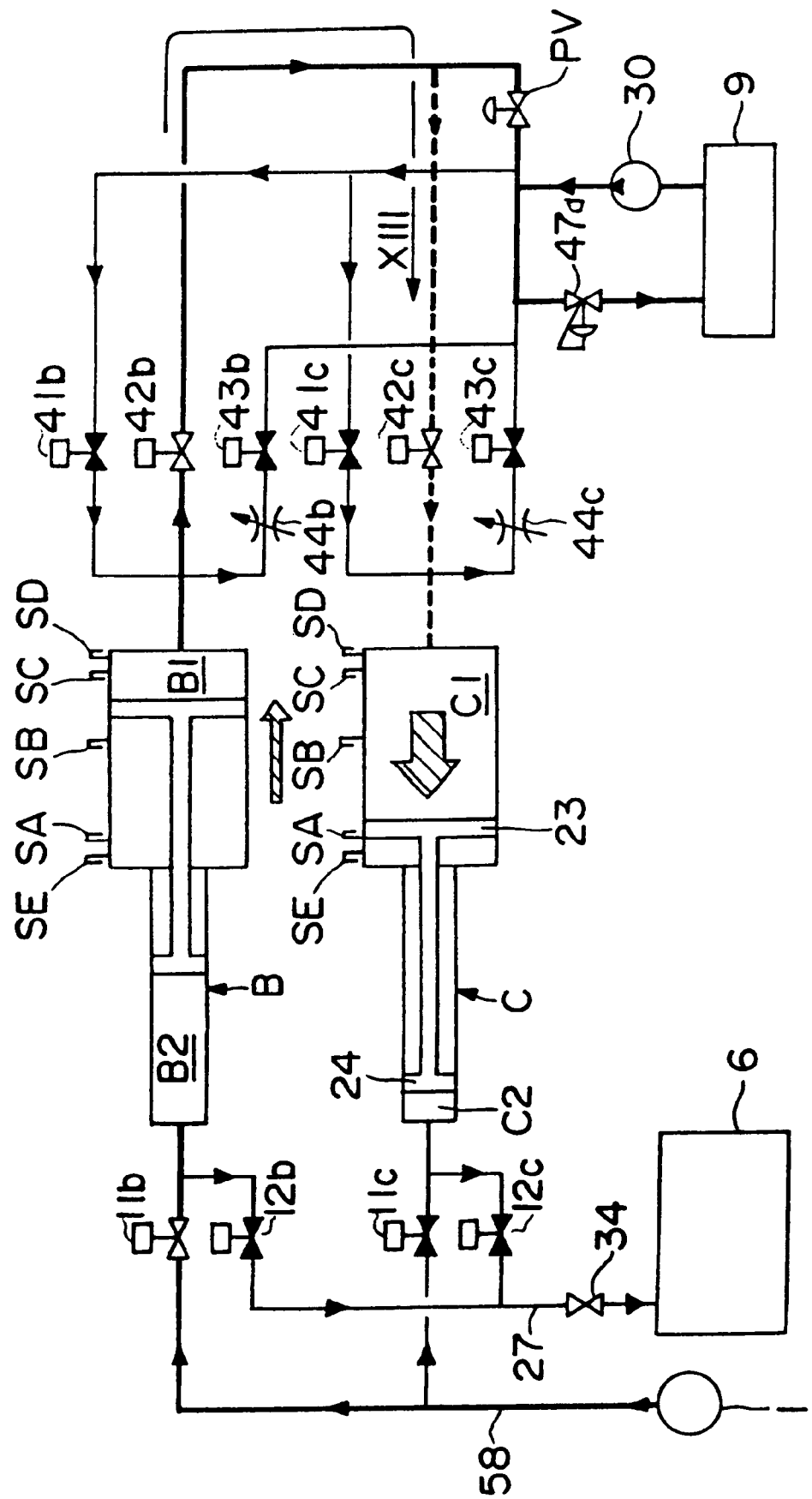
FIG. 10 is a schematic circuit diagram showing a third stage of operation of the central portion of the apparatus, following the second stage of operation shown in FIG. 9.

Then, when the larger-diameter piston 23 of the depressurizing device C is detected by the corresponding discharge-position limit switch SA in a third stage of operation shown in FIG. 10 which follows the second stage of operation shown in FIG. 9, the shutoff valves 12$c$, 41$c$ are closed and thereafter the shutoff valve 42$c$ is opened to switch the depressurizing device C into the pressurization mode. Specifically, the working fluid discharged from the third pressure chamber B1 is supplied through the shutoff valves 42$b$, 42$c$ into the third pressure chamber C1 as indicated by the arrow XIII while the working fluid is being maintained under substantially the same pressure. The working fluid thus supplied to the third pressure chamber C1 pressurizes the third pressure chamber C1 and also the fourth pressure chamber C2, imposing a back pressure on the pistons 23, 24 of the depressurizing device C to place the depressurizing device C into readiness for the suction mode, i.e., to operate the depressurizing device C in the pressurization mode. The end of the pressurization mode may be recognized when a pressurization-position limit switch SE detects the larger-diameter piston 23 of the depressurizing device C. The end of the discharge mode or the pressurization mode may also be detected by pressure detectors connected to the pipes connected to the larger-diameter cylinders 21 when the pressure detectors detect a predetermined pressure buildup therein. The pressurization mode can thus be carried out by effectively utilizing the high pressure of the liquid material X.

Figure 11:
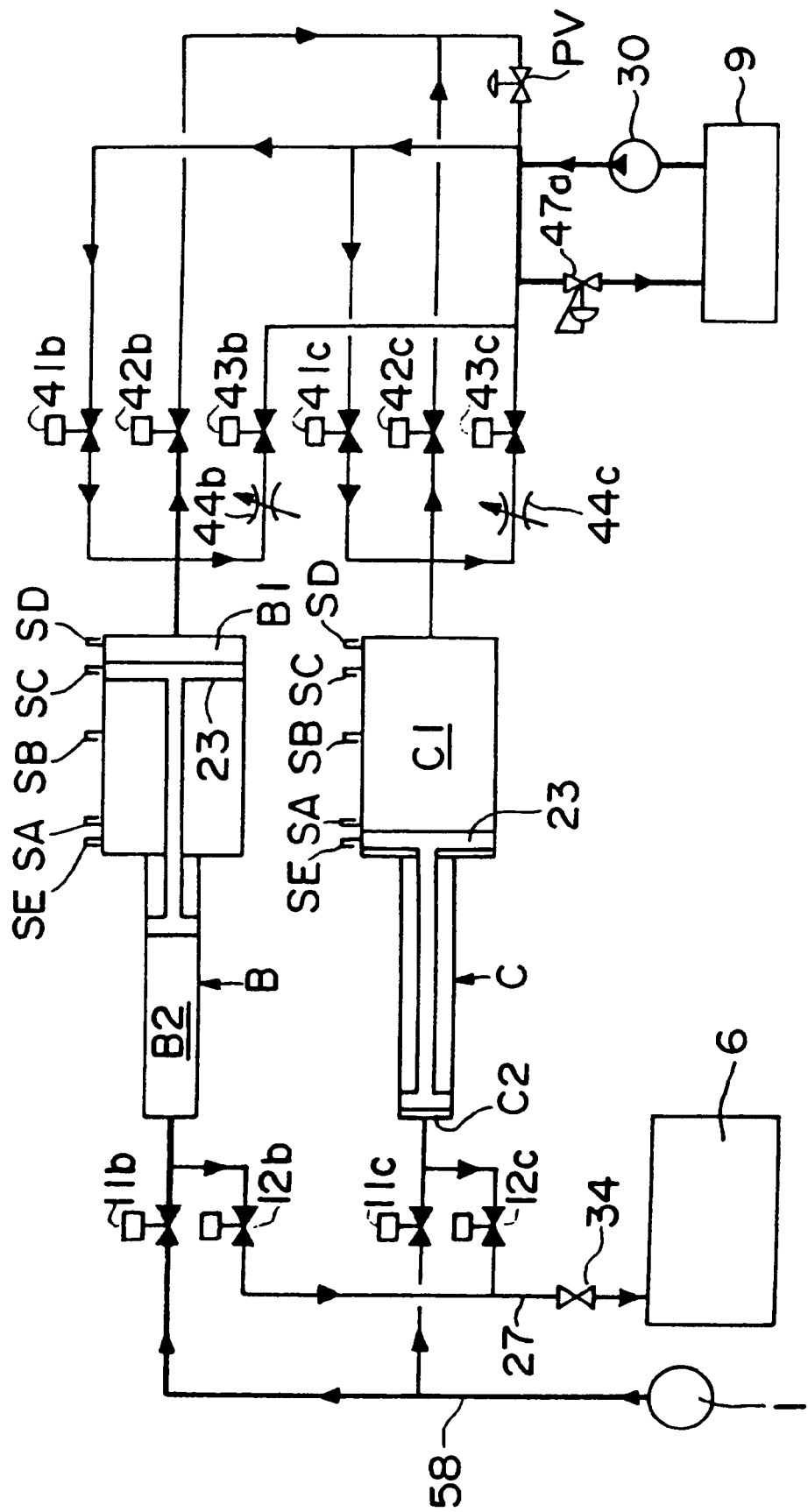
FIG. 11 is a schematic circuit diagram showing a fourth stage of operation of the central portion of the apparatus, following the third stage of operation shown in FIG. 10.

Upon detection by the suction-position limit switch SC of the larger-diameter piston 23 of the depressurizing device B and also upon detection by the pressurization-position limit switch SE of the larger-diameter piston 23 of the depressurizing device C, the shutoff valves 42$b$, 42$c$ are closed and the shutoff valve 11$b$ is closed in a fourth stage of operation shown in FIG. 11 which follows the third stage of operation shown in FIG. 10. In the fourth stage of operation shown in FIG. 11, the depressurizing device B ends the suction mode and is able to start the depressurization mode, and the depressurizing device C ends the pressurization mode and is able to start the suction mode. With the shutoff valves 41$b$, 41$c$, 42$b$, 42$c$, 43$b$, 43$c$ closed, the working fluid from the pump 30 returns through the pressure control valve 47$a$ to the working fluid tank 9.

Thereafter, the depressurizing device B starts the depressurization mode because the fourth pressure chamber B2 is filled up with the liquid material X, and the depressurizing device C starts the suction mode with its fourth pressure chamber C2 because it has carried out the pressurization mode.

Subsequently, substantially the same operation as described above is repeated by the depressurizing device B which operates in the same manner as the depressurizing device C described above, and the depressurizing device C which operates in the same manner as the depressurizing device B described above. When the above operation is repeated twice, one cycle of operation is finished. In this manner, as shown in FIGS. 8 through 11, the depressurizing devices C, B in the discharge mode are supplied with the working fluid from at least one of the depressurizing devices B, C in the suction mode and the pump 30, the working fluid from the depressurizing devices B, C in the depressurization mode returns to the working fluid tank 9, and the depressurizing devices C, B in the pressurization mode are supplied with the working fluid directly from the depressurizing devices B, C in the mode, so that the suction modes can successively be carried out.

FIGS. 12 through 15 show a central portion of an apparatus for processing a high-pressure liquid material according to a third embodiment of the present invention. Those parts shown in FIGS. 12 through 15 which are identical to those parts shown in FIGS. 8 through 11 are denoted by identical reference numerals, and will not be described in detail below. In the third embodiment, the depressurizing means 10 comprises two depressurizing devices B, C, the working fluid control system 7 is identical to a portion of the working fluid control system 7 shown in FIG. 6, and the depressurizing device A and the shutoff valves 11a, 12a, 41a, 42a, 43a associated therewith are dispensed with. A side of the working fluid control system 7 which is lower in pressure than the pressure control valve PV is open directly into the working fluid tank 9, and a side of the working fluid control system 7 which is higher in pressure than the pressure control valve PV is connected through a shutoff valve 61 to a low-pressure side of the working fluid control system 7, i.e., a side of the working fluid control system 7 to which the pressure from the pump 30 is directly applied. A flow control valve 60 is capable of supplying the working fluid from the working fluid tank 9 with the pump 30 at a constant rate selectively to the third pressure chambers B1, C1, for thereby causing the depressurizing devices B, C to discharge the liquid material X in the discharge mode. The apparatus according to the third embodiment resides particularly in that the depressurizing means 10 comprises two depressurizing devices B, C for carrying out discharge modes successively.

The pump 30 is actuated at all times to apply a constant pressure to the low-pressure side of the working fluid control system 7 for delivering the working fluid under a low pressure at a constant rate through the flow control valve 60 to the depressurizing devices B, C in the discharge mode. The working fluid control system 7 according to the third embodiment also has a pump 31 dedicated for use in the pressurization mode. The pump 31 is capable of supplying the working fluid from the working fluid tank 9 selectively through flow control valves 49b, 49c to the third pressure chambers B1, C1 by duly opening or closing shutoff valves 33b, 33c. A pressure control valve 48 serves to control the pressure of the working fluid which is delivered to shutoff valves 33b, 33c connected respectively to the flow control valves 49b, 49c by the pump 31.

Figure 12:
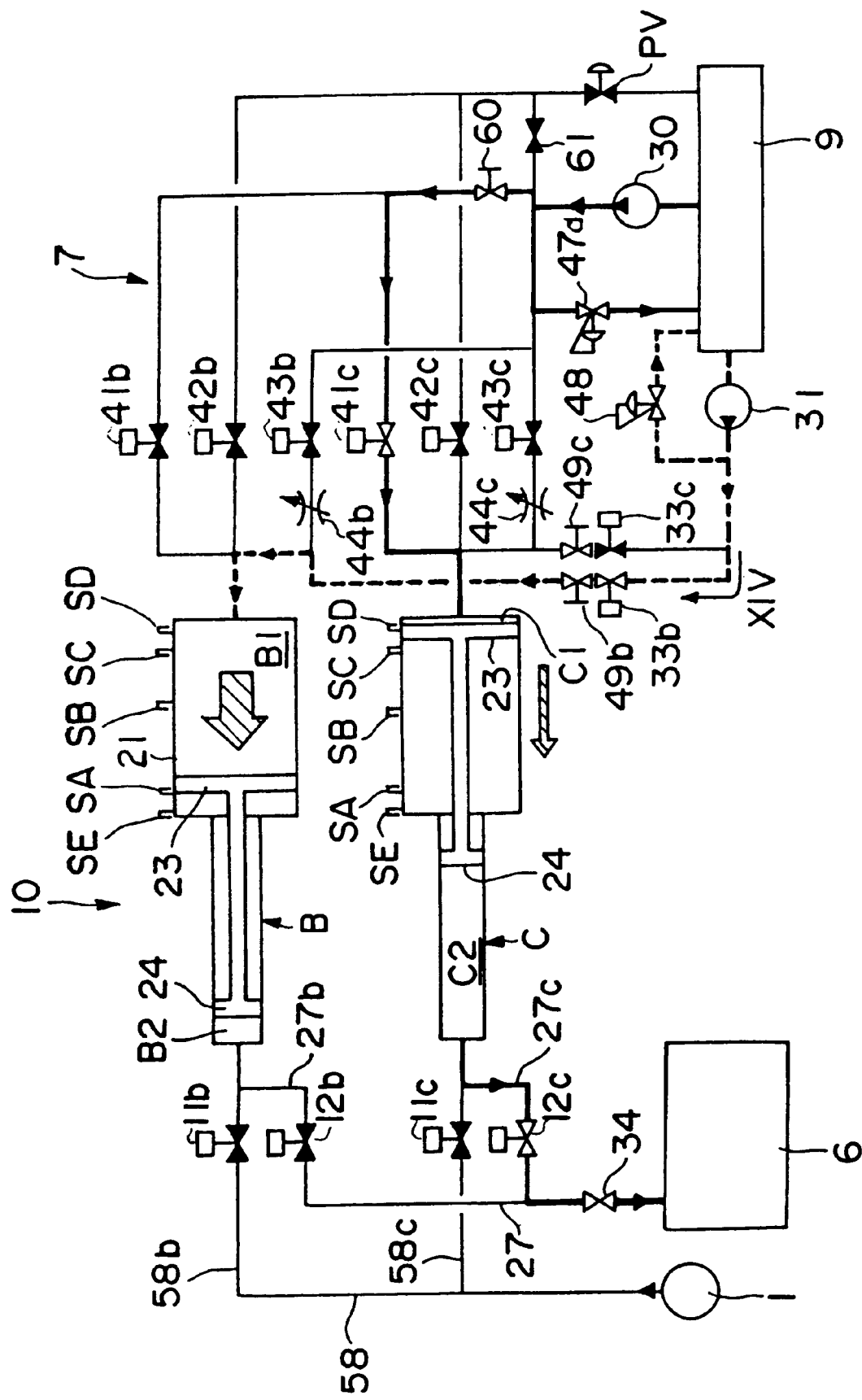
FIG. 12 is a schematic circuit diagram showing a first stage of operation of a central portion of an apparatus for processing a high-pressure liquid material according to a third embodiment of the present invention.

The discharge modes are carried out successively by the apparatus according to the third embodiment as follows:

It is assumed that in a first stage of operation shown in FIG. 12, the fourth pressure chamber B2 of the depressurizing device B has finished the discharge mode and is about to start the pressurization mode, and the fourth pressure chamber C2 of the depressurizing device C has finished the depressurization mode and is about to start the discharge mode. Only the shutoff valves 12c, 41c, 33b, shown blank in FIG. 12, are opened, and the third pressure chamber B1 of the depressurizing device B which is in the pressurization mode is supplied with the working fluid from the working fluid 9 through the flow control valve 49b by the pump 31. At this time, the working fluid from the working fluid tank 9 flows as indicated by the arrow XIV in FIG. 12, advancing the pistons 23, 24 of the depressurizing device B. The end of the pressurization mode may be recognized when the pressurization-position limit switch SE detects the larger-diameter piston 23 of the pressurizing device B. The end of the pressurization mode may also be detected by pressure detectors connected to the pipes connected to the larger-diameter cylinders 21 when the pressure detectors detect a predetermined pressure buildup therein. The third pressure chamber C1 of the depressurizing device C which is in the discharge mode is supplied with the working fluid from the working fluid tank 9 at a given rate through the flow control valve 60 and the shutoff valve 41c by the pump 30, causing the liquid material X to be discharged from the fourth pressure chamber C2 through the shutoff valve 12c to the product tank 6.

Figure 13:
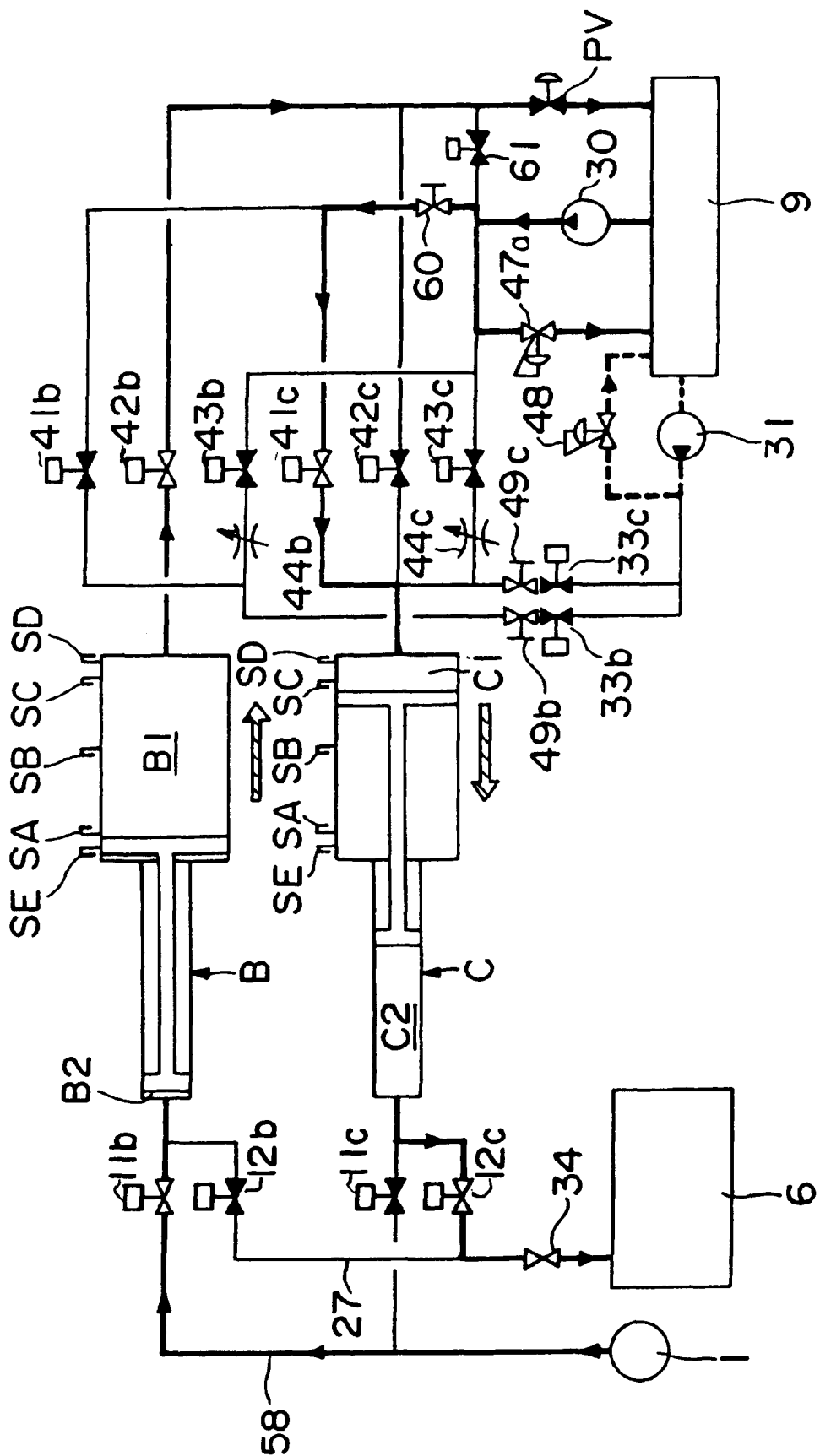
FIG. 13 is a schematic circuit diagram showing a second stage of operation of the central portion of the apparatus, following the first stage of operation shown in FIG. 12.

When the pressurization mode of the depressurizing device B is completed while the discharge mode of the depressurizing device C is being continued in a second stage of operation shown in FIG. 13 which follows the first stage of operation shown in FIG. 12, the larger-diameter piston 23 of the depressurizing device B is detected by the pressurization-position limit switch SE. Based on a signal from the pressurization-position limit switch SE, the shutoff valve 33b is closed and the shutoff valves 11b, 42b are opened, bringing the depressurizing device B into the suction mode. The end of the pressurization mode may also be detected by pressure detectors connected to the pipes connected to the larger-diameter cylinders 21 when the pressure detectors detect a predetermined pressure buildup therein. While the depressurizing device C is operating continuously in the discharge mode, therefore, the working fluid flows from the third pressure chamber B1 of the depressurizing device B in the suction mode back to the working fluid tank 9 while being subjected to pressure control by the pressure control valve PV. With the shutoff valve 33b closed, the working fluid delivered by the pump 31 flows through the pressure control valve 48 back to the working fluid tank 9. When the shutoff valve 61 is opened during the suction mode of the depressurizing device B, the working fluid in the third pressure chamber B1 can be supplied through the flow control valve 60 and the shutoff valve 41c to the third pressure chamber C1 which is being in the discharge mode. The depressurizing device C can thus efficiently carry out the discharge mode.

Figure 14:
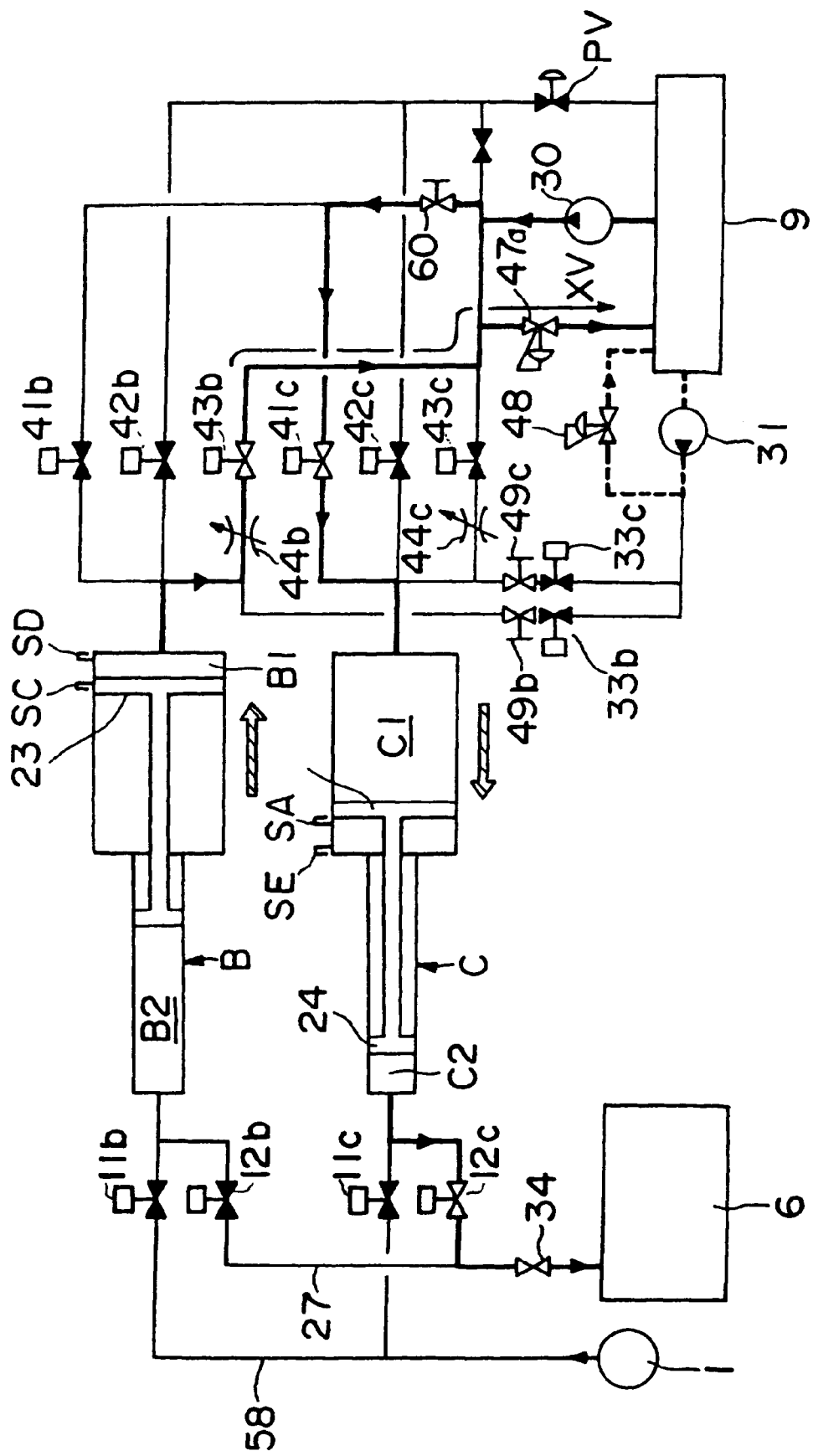
FIG. 14 is a schematic circuit diagram showing a third stage of operation of the central portion of the apparatus, following the second stage of operation shown in FIG. 13.

Then, when the larger-diameter piston 23 of the depressurizing device B is detected by the corresponding suction-position limit switch SC in a third stage of operation shown in FIG. 14 which follows the second stage of operation shown in FIG. 13, the shutoff valves 11b, 41b are closed and thereafter the shutoff valve 43b is opened to switch the depressurizing device B into the depressurization mode. The liquid material X in the fourth pressure chamber B2 is expanded in volume and depressurized, contracting the third pressure chamber B1. As the third pressure chamber B1 is contracted, the working fluid discharged from the third pressure chamber B1 flows through the restrictor 44b, the shutoff valve 43b, and the pressure control valve 47a back to the working fluid tank 9 as indicated by the arrow XV. The end of the depressurization mode of the depressurizing device B may be recognized when the depressurization-position limit switch SD detects the larger-diameter piston 23 of the pressurizing device B. The end of the depressurization mode may also be detected by pressure detectors connected to the pipes connected to the larger-diameter cylinders 21 when the pressure detectors detect a predetermined pressure buildup therein.

Figure 15:
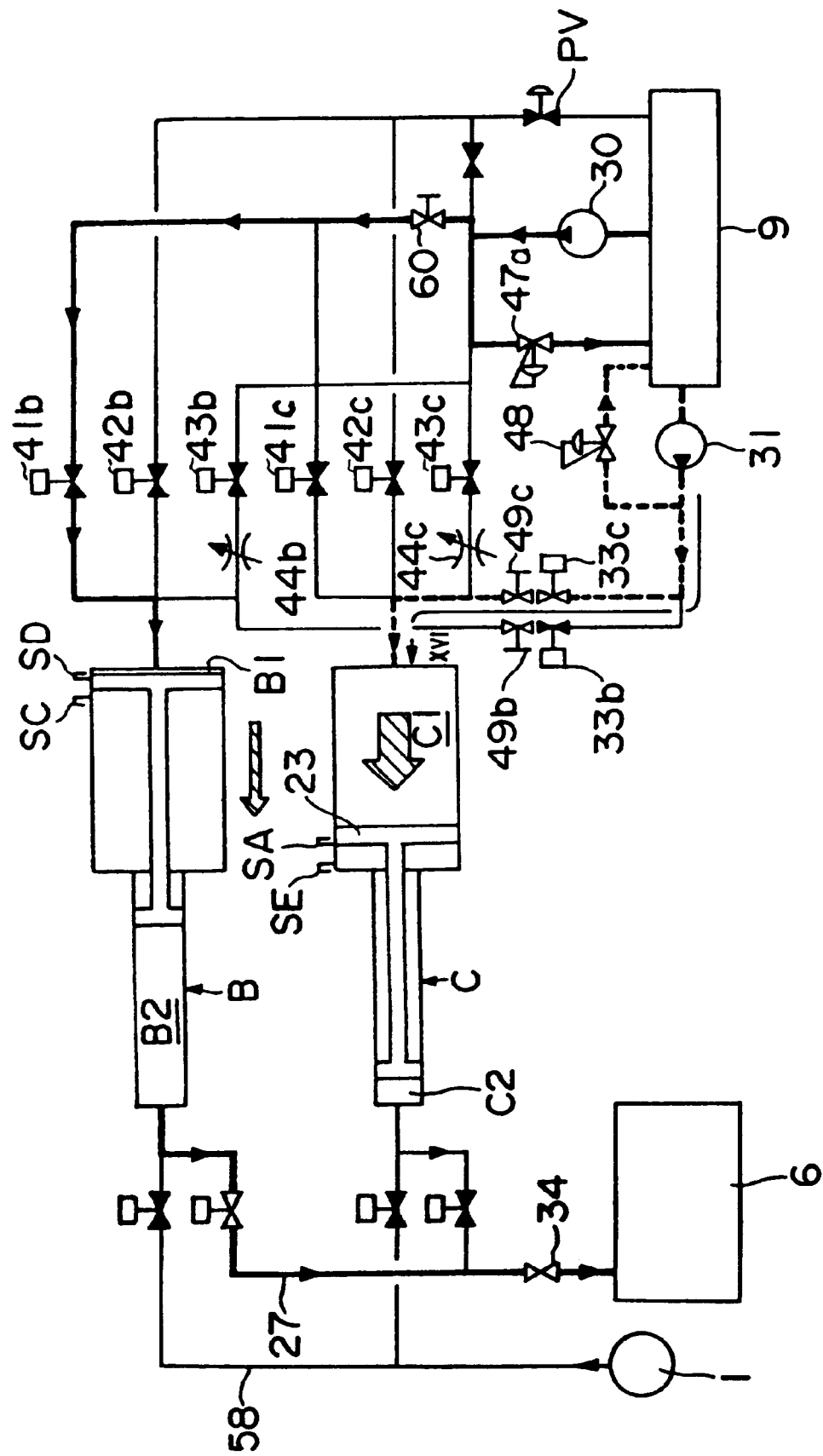
FIG. 15 is a schematic circuit diagram showing a fourth stage of operation of the central portion of the apparatus, following the third stage of operation shown in FIG. 14.

Upon detection by the discharge-position limit switch SA of the larger-diameter piston 23 of the depressurizing device C, the shutoff valves 12c, 41c are closed and thereafter the shutoff valve 33c is opened in a fourth stage of operation shown in FIG. 15 which follows the third stage of operation shown in FIG. 14. In the fourth stage of operation shown in FIG. 15, the working fluid in the working fluid tank 9 is supplied through the shutoff valve 33c and the flow control valve 49c to the third pressure chamber C1 by the pump 31 as indicated by the arrow XVI in FIG. 15, bringing the depressurizing device C into the pressurization mode. The working fluid thus supplied to the third pressure chamber C1 pressurizes the third pressure chamber C1 and also the fourth pressure chamber C2, imposing a back pressure on the pistons 23, 24 of the pressurizing device C to place the pressurizing device C into readiness for the suction mode. The end of the pressurization mode may be recognized when the pressurization-position limit switch SE detects the larger-diameter piston 23 of the pressurizing device C. The end of the pressurization mode may also be detected by pressure detectors connected to the pipes connected to the larger-diameter cylinders 21 when the pressure detectors detect a predetermined pressure buildup therein. The pressurization mode can thus be carried out by the pump 31, without utilizing the high pressure of the liquid material X.

Thereafter, the depressurizing device B starts the discharge mode because the liquid material X in the fourth pressure chamber B2 has been depressurized, and the depressurizing device C starts the suction mode because the fourth pressure chamber C2 is in the pressurization mode.

Subsequently, substantially the same operation as described above is repeated by the depressurizing device B which operates in the same manner as the depressrizing device C described above, and the depressurizing device C which operates in the same manner as the depressrizing device B described above. When the above operation is repeated twice, one cycle of operation is finished. In this manner, as shown in FIGS. 12 through 15, the depressurizing devices C, B in the discharge mode are supplied with the working fluid from at least one of the depressurizing devices B, C in the suction mode and the pump 30, and the working fluid from the depressurizing devices B, C in the depressurization mode returns to the working fluid tank 9, in the same manner as with the second embodiment. The depressurizing devices C, B in the pressurization mode are supplied with the working fluid under a relatively high pressure by the dedicated pump 31, so that the discharge modes can successively be carried out.

The apparatus for processing a high-pressure liquid material according to the present invention and methods carried out by the apparatus offer the following advantages:

(1) The depressurizing means comprises a plurality of individually operable depressurizing devices each comprising a pressure intensifier in the form of a cylinder assembly having a processing pressure chamber for selectively receiving a liquid material supplied under a high pressure from a high-pressure vessel and a working pressure chamber for receiving a working fluid. The depressurizing means is relatively short and requires a reduced space for installation, and a high degree of freedom or flexibility is given to the layout of the working pressure chambers and the individual volumes of and pressures in the working pressure chambers while in operation. Therefore, times required for the depressurizing devices to draw, depressurize, and discharge the liquid material in suction, depressurization, and discharge modes can be adjusted depending on the type of the liquid material, so that the apparatus can operate highly flexibly.

(2) Because the working fluid flows directly between the working pressure chambers for operating the depressurizing devices in the discharge mode, the working fluid discharged from the depressurizing devices in the suction or depressurization mode can effectively be utilized for the discharge mode. As a result, the energy of the working fluid can effectively be utilized and saved.

(3) Furthermore, since a pressurization mode is effected prior to the suction mode to apply, to the working pressure chambers, a back pressure which substantially counterbalances the high pressure of the liquid material supplied from the high-pressure chamber, no undue pressure shock is applied to pipes and various valves, and hence the durability of these components remains high.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. An apparatus for processing a pressurized liquid material, comprising:

a vessel having a pressurization chamber;

pressurizing means for supplying a liquid material to said vessel in order to allow the liquid material to be processed under a pressure therein to create a processed liquid material;

depressurizing means for receiving and depressurizing the processed liquid material supplied under pressure from said vessel; and a working fluid control system for controlling said depressurizing means;

said depressurizing means having a plurality of cylinder devices comprising respective pairs of interlinked pistons which define, in said cylinder devices, respective processing pressure chambers for selectively receiving the processed liquid material from said vessel, and respective working pressure chambers for selectively receiving a working fluid from said working fluid control system;

said working fluid control system comprising means for bringing one of said working pressure chambers into communication with at least another one of the working pressure chambers to pass the working fluid therebetween for causing said cylinder devices to successively draw, depressurize, and discharge the processed liquid material in respective suction, depressurization, and discharge modes, and said working fluid control system further comprising means for supplying the working fluid to the working pressure chamber of one of said cylinder devices before said one of said cylinder devices begins the suction mode, and such that the supplied working fluid applies a back pressure to the piston which defines the processing pressure chamber of said one of said cylinder devices, the back pressure being created by the working fluid discharged from said at least another one of the working pressure chambers of said another one of said cylinder devices which is operating in the suction mode, the back pressure being maintained in the working pressure chamber of said one of said cylinder devices throughout the suction mode of said one of said cylinder devices.

2. An apparatus according to claim 1, wherein in one stage of operation said working fluid control system comprises means for supplying the working fluid discharged from the working pressure chamber of said one of said cylinder devices which is operating in at least the suction mode to the working pressure chamber of another one of said cylinder devices which is operating in the discharge mode.

3. An apparatus according to claim 2, wherein in another stage of operation said working fluid control system comprises means for supplying the working fluid discharged from the working pressure chamber of another one of said cylinder devices which is operating in said depressurization mode, together with the working fluid discharged from the working pressure chamber of said one of the cylinder devices which is operating in said suction mode, to the working pressure chamber of said other one of said cylinder devices which is operating in said discharge mode.

4. An apparatus according to claim 2, wherein each of said cylinder devices comprises a smaller-diameter cylinder and a larger-diameter cylinder disposed adjacent to said smaller-diameter cylinder, said pistons being slidably fitted in said smaller-diameter cylinder and said larger-diameter cylinder, said piston which defines one of the processing pressure chambers being smaller in diameter than said piston which defines one of the working pressure chambers.

5. An apparatus according to claim 4, wherein said working fluid control system comprises means for passing the working fluid discharged from the working pressure chamber of said one of the cylinder devices which is operating in said suction mode, through a pressure control valve to depressurize the working fluid, and then supplying the depressurized working fluid to the working pressure chamber of said other one of said cylinder devices which is operating in the discharge mode.

6. An apparatus according to claim 1, wherein in one stage of operation said working fluid control system comprises means for supplying the working fluid discharged from the working pressure chamber of said one of said cylinder devices which is operating in the suction mode to the working pressure chamber of said another one of said cylinder devices which has completed the discharge mode to apply a back pressure to said piston which defines the processing pressure chamber of said another one of said cylinder devices.

7. An apparatus according to claim 6, wherein said working fluid control system comprises means for regulating said back pressure so as to substantially counterbalance the pressure of said liquid material when the liquid material is drawn from said vessel in the suction mode by said another one of the cylinder devices which has completed the discharge mode.

8. An apparatus according to claim 1, wherein said working fluid control system comprises:
a working fluid tank containing the working fluid;
a pump for supplying the working fluid from said working fluid tank selectively to the working pressure chambers of said cylinder devices; and
means for supplying the working fluid from said working fluid tank to the working pressure chamber of said one of said cylinder devices which is operating in the discharge mode.

9. An apparatus according to claim 1, wherein said depressurizing means has first, second, and third cylinder devices, and said working fluid control system comprises:
a first piping for depressurizing and supplying the working fluid from the working pressure chamber of the first cylinder device which is operating in the suction mode to the working pressure chamber of the second cylinder device which is operating in the discharge mode;
a second piping for depressurizing and supplying the working fluid from the working pressure chamber of the third cylinder device which is operating in the depressurization mode to the working pressure chamber of the second cylinder device which is operating in the discharge mode; and
a third piping for supplying the working fluid from the working pressure chamber of the first cylinder device which is operating in the suction mode to the working pressure chamber of the second cylinder device which has completed the discharge mode.

10. An apparatus according to claim 1, wherein in one stage of operation said working fluid control system comprises said means for supplying the working fluid to the working pressure chamber of said one of said cylinder devices which has completed the discharge mode, and pressurizing the supplied working fluid to apply back pressure to the piston which defines the processing pressure chamber of said one of said cylinder devices.

11. An apparatus according to claim 10, wherein said depressurizing means has two cylinder devices, and said working fluid control system comprises:
a working fluid tank containing the working fluid;
a pump for supplying the working fluid from said working fluid tank selectively to the working pressure chambers of said cylinder devices; and
said means for supplying the working pressure chamber of said one of said cylinder devices which is operating in the discharge mode, with the working fluid discharged from at least one of the working pressure chamber of the other of said cylinder devices which is operating in the suction mode and said pump, completing said discharge mode of said one of the cylinder devices while said other of said cylinder devices is operating in the suction mode, supplying and pressurizing the working pressure chamber of said one of the cylinder devices with only the working fluid discharged from the working pressure chamber of the other of said cylinder devices which is operating in the suction mode, bringing said other of said cylinder devices into the depressurization mode after said other of said cylinder devices has completed the suction mode, returning the working fluid discharged from the working pressure chamber of said other of said cylinder devices to said working fluid tank, and starting to operate said one of the cylinder devices in the suction mode, whereby said depressurizing means can carry out a succession of suction modes.

12. An apparatus according to claim 10, wherein said depressurizing means has two cylinder devices, and said working fluid control system comprises:
a working fluid tank containing the working fluid;
first and second pumps for supplying the working fluid from said working fluid tank selectively to the working pressure chambers of said cylinder devices, and
means for supplying the working pressure chamber of one of said cylinder devices which is operating in the discharge mode, with the working fluid discharged from at least one of the working pressure chamber of the other of said cylinder devices which is operating in the suction mode and the first pump, completing said suction mode of said other of the cylinder devices while said one of said cylinder devices is operating in the discharge mode, bringing said other of said cylinder devices into the depressurization mode, returning the working fluid discharged from the working pressure chamber of said other of said cylinder devices to said working fluid tank, supplying and pressurizing the working pressure chamber of said one of the cylinder devices with the working fluid from said second pump after said one of said cylinder devices has completed the discharge mode, and bringing said other of the cylinder devices from the depressurization mode into the discharge mode, whereby said depressurizing means can carry out a succession of discharge modes.

13. A method of processing a liquid material, comprising the steps of:

supplying the liquid material from pressurizing means to a vessel having a pressurization chamber;

processing the liquid material under pressure in said vessel to create processed liquid material;

thereafter depressurizing the processed liquid material with depressurizing means;

said depressurizing means having a plurality of cylinder devices comprising respective pairs of interlinked pistons which define, in said cylinder devices, respective processing pressure chambers for selectively receiving the processed liquid material from said vessel, and respective working pressure chambers for selectively receiving a working fluid;

bringing one of said working pressure chambers into communication with at least another one of the working pressure chambers to pass the working fluid therebetween for causing said cylinder devices to successively draw, depressurize, and discharge the liquid material in respective suction, depressurization, and discharge modes; and supplying the working fluid to the working pressure chamber of said one of said cylinder devices before said one of said cylinder devices begins the suction mode, and such that the supplied working fluid applies a back pressure to the piston which defines the processing pressure chamber of said one of said cylinder devices, the back pressure being created by the working fluid discharged from said at least another one of the working pressure chambers of said another one of said cylinder devices which is operating in the suction mode, the back pressure being maintained in the working pressure chamber of said one of said cylinder devices throughout the suction mode of said one of said cylinder devices.

14. A method according to claim 13, further comprising the step of:

supplying the working fluid discharged from the working pressure chamber of said one of said cylinder devices which is operating in at least the suction mode to the working pressure chamber of another one of said cylinder devices which is operating in the discharge mode.

15. A method according to claim 14, further comprising the step of:

supplying the working fluid discharged from the working pressure chamber of another one of said cylinder devices which is operating in said depressurization mode, together with the working fluid discharged from the working pressure chamber of said one of the cylinder devices which is operating in said suction mode, to the working pressure chamber of said other one of said cylinder devices which is operating in said discharge mode.

16. A method according to claim 14, wherein each of said cylinder devices comprises a smaller-diameter cylinder and a larger-diameter cylinder disposed adjacent to said smaller-diameter cylinder, said pistons being slidably fitted in said smaller-diameter cylinder and said larger-diameter cylinder, said piston which defines one of the processing pressure chambers being smaller in diameter than said piston which defines one of the working pressure chambers.

17. A method according to claim 16, further comprising the step of:

passing the working fluid discharged from the working pressure chamber of said one of the cylinder devices which is operating in said suction mode, through a pressure control valve to depressurize the working fluid, and then supplying the depressurized working fluid to the working pressure chamber of said other one of said cylinder devices which is operating in the discharge mode.

18. A method according to claim 13, further comprising the step of:

supplying the working fluid discharged from the working pressure chamber of one of said cylinder devices which is operating in the suction mode to the working pressure chamber of another one of said cylinder devices which has completed the discharge mode to apply a back pressure to said piston which defines the processing pressure chamber of said other one of said cylinder devices.

19. A method according to claim 18, further comprising the step of:

regulating said back pressure so as to substantially counterbalance the pressure of said liquid material when the liquid material is drawn from said vessel in the suction mode by said other one of the cylinder devices which has completed the discharge mode.

20. A method according to claim 13, further comprising the step of:

supplying and pressurizing the working pressure chamber of one of said cylinder devices which has completed the discharge mode with the working fluid from a dedicated pump to apply a back pressure to said piston which defines the processing pressure chamber of said one of said cylinder devices.

21. A method according to claim 20, wherein said depressurizing means has two cylinder devices, further comprising the steps of:

providing a working fluid tank containing the working fluid and a pump for supplying the working fluid from said working fluid tank selectively to the working pressure chambers of said cylinder devices;

supplying the working pressure chamber of one of said cylinder devices which is operating in the discharge mode, with the working fluid discharged from at least one of the working pressure chamber of the other of said cylinder devices which is operating in the suction mode and said pump;

completing said discharge mode of said one of the cylinder devices while said other of said cylinder devices is operating in the suction mode;

supplying and pressurizing the working pressure chamber of said one of the cylinder devices with only the working fluid discharged from the working pressure chamber of the other of said cylinder devices which is operating in the suction mode;

bringing said other of said cylinder devices into the depressurization mode after said other of said cylinder devices has completed the suction mode;

returning the working fluid discharged from the working pressure chamber of said other of said cylinder devices to said working fluid tank; and starting to operate said one of the cylinder devices in the suction mode, whereby said depressurizing means can carry out a succession of suction modes.

22. A method according to claim 20, wherein said depressurizing means has two cylinder devices, further comprising the steps of:

providing a working fluid tank containing the working fluid and first and second pumps for supplying the working fluid from said working fluid tank selectively to the working pressure chambers of said cylinder devices;

supplying the working pressure chamber of one of said cylinder devices which is operating in the discharge mode, with the working fluid discharged from at least one of the working pressure chamber of the other of said cylinder devices which is operating in the suction mode and the first pump;

completing said suction mode of said other of the cylinder devices while said one of said cylinder devices is operating in the discharge mode;

bringing said other of said cylinder devices into the depressurization mode;

returning the working fluid discharged from the working pressure chamber of said other of said cylinder devices to said working fluid tank;

supplying and pressurizing the working pressure chamber of said one of the cylinder devices with the working fluid from said second pump after said one of said cylinder devices has completed the discharge mode; and bringing said other of the cylinder devices from the depressurization mode into the discharge mode, whereby said depressurizing means can carry out a succession of discharge modes.

* * * * *